United States Patent
Tomioka

(10) Patent No.: US 9,726,867 B2
(45) Date of Patent: Aug. 8, 2017

(54) VARIABLE MAGNIFICATION OPTICAL SYSTEM AND IMAGING APPARATUS

(71) Applicant: FUJIFILM Corporation, Tokyo (JP)

(72) Inventor: Ukyo Tomioka, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/708,749

(22) Filed: May 11, 2015

(65) Prior Publication Data
US 2015/0346467 A1    Dec. 3, 2015

(30) Foreign Application Priority Data

May 27, 2014  (JP) ................... 2014-108716

(51) Int. Cl.
| | | |
|---|---|---|
| G02B 15/16 | (2006.01) | |
| G02B 15/177 | (2006.01) | |
| G02B 13/00 | (2006.01) | |
| G02B 13/04 | (2006.01) | |

(52) U.S. Cl.
CPC ......... *G02B 15/161* (2013.01); *G02B 13/006* (2013.01); *G02B 13/008* (2013.01); *G02B 13/009* (2013.01); *G02B 13/0045* (2013.01); *G02B 13/04* (2013.01); *G02B 15/177* (2013.01)

(58) Field of Classification Search
CPC .... G02B 15/15; G02B 15/161; G02B 15/177; G02B 15/14; G02B 13/009; G02B 13/04; G02B 13/006; G02B 13/008; G02B 13/0045
USPC ....................................................... 359/691
See application file for complete search history.

(56) References Cited

U.S. PATENT DOCUMENTS

| | | | | |
|---|---|---|---|---|
| 2003/0234985 A1* | 12/2003 | Sato | ..................... | G02B 15/177 359/680 |
| 2008/0068726 A1* | 3/2008 | Horneber | ............... | G02B 13/04 359/680 |
| 2011/0116172 A1* | 5/2011 | Yamagami | ........... | G02B 15/177 359/684 |
| 2012/0218646 A1* | 8/2012 | Kimura | ................ | G02B 15/177 359/691 |
| 2013/0329305 A1* | 12/2013 | Kunugise | ............... | G02B 15/14 359/691 |

(Continued)

FOREIGN PATENT DOCUMENTS

WO    WO 2012/153505    * 11/2012

*Primary Examiner* — Jordan Schwartz
(74) *Attorney, Agent, or Firm* — Young & Thompson

(57) ABSTRACT

A variable magnification optical system consists of a first lens-group having negative refractive-power, a stop and a second lens-group having positive refractive-power in this order from an object-side. The first lens-group includes an L11 negative meniscus lens, an L12 negative lens and a C11 cemented lens, in which a biconcave lens and a positive lens are cemented together in this order from the object-side, in this order from the object-side. The second lens-group includes an L21 positive lens that is arranged closest to the object-side and includes at least one aspheric surface, and an object-side surface of which is convex, and only two cemented lenses toward an image-side of the L21 positive lens, and each of which consists of a negative lens and a positive lens cemented together in this order from the object-side. The following conditional expressions (1) and (2) are satisfied:

$$-1.0 < Rf11/Rf12 < 0.7 \quad (1); \text{ and}$$

$$55.0 < vdave1 \quad (2).$$

20 Claims, 18 Drawing Sheets

(56) References Cited

U.S. PATENT DOCUMENTS

2014/0043691 A1 2/2014 Tomioka
2016/0306147 A1* 10/2016 Nakano ............... G02B 15/177

* cited by examiner

EXAMPLE 4

FIG.10
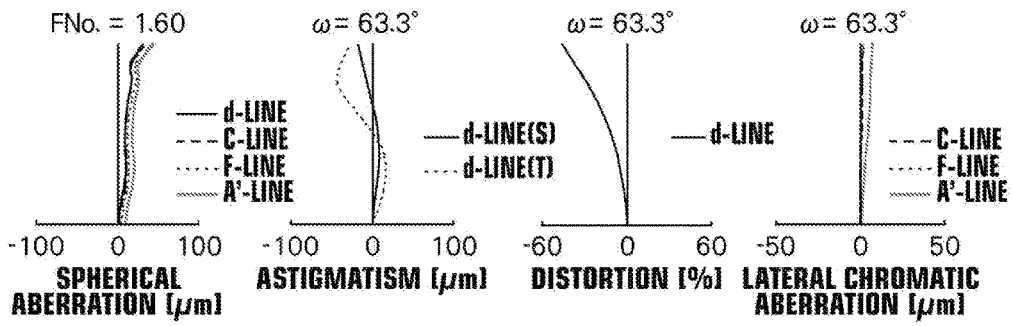
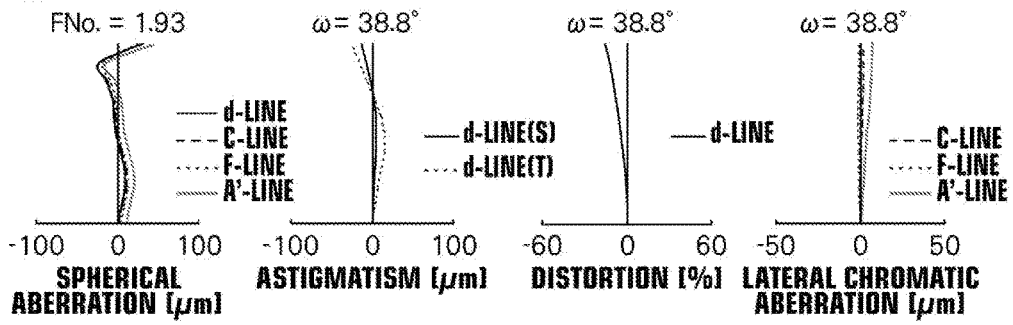
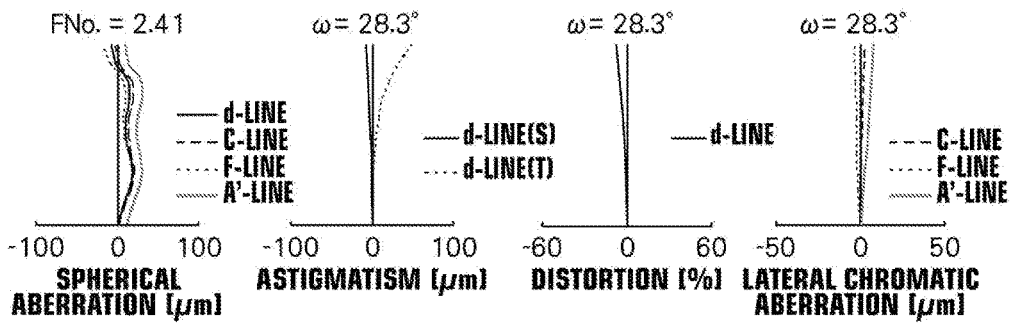

FIG.11
EXAMPLE 2
WIDE-ANGLE END
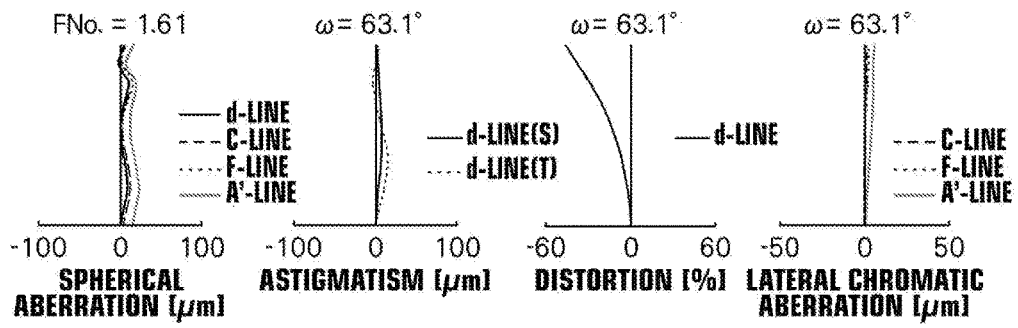
MIDDLE
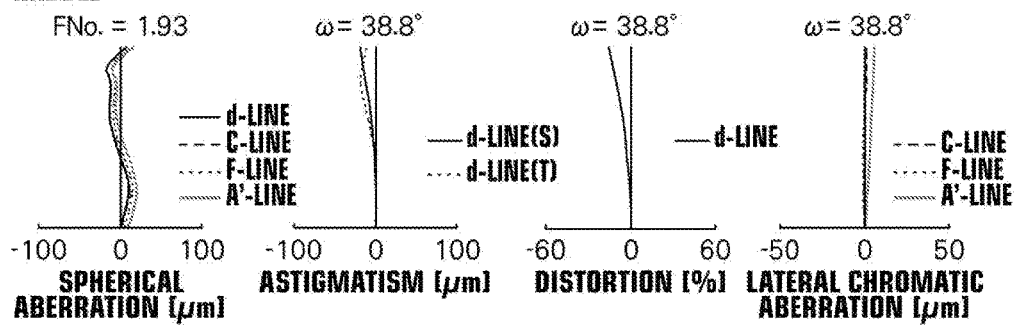
TELEPHOTO END
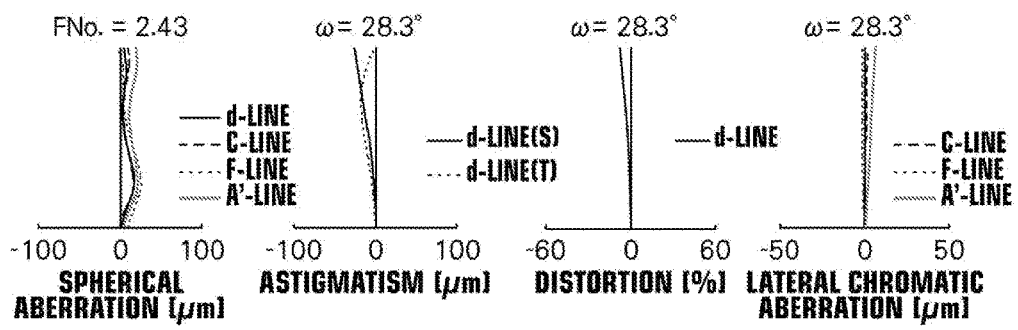

FIG.12
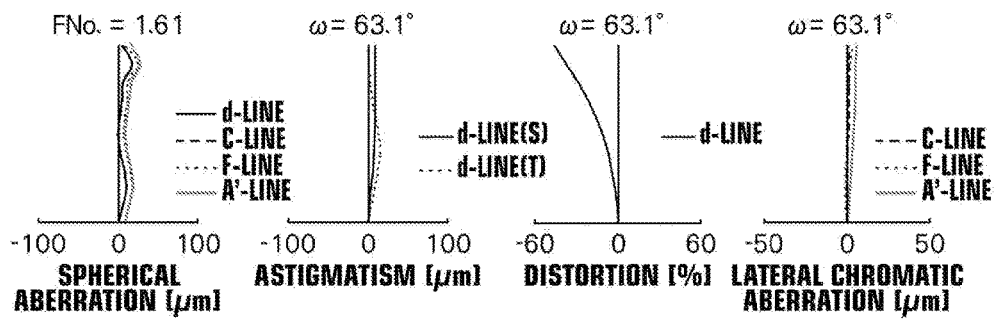
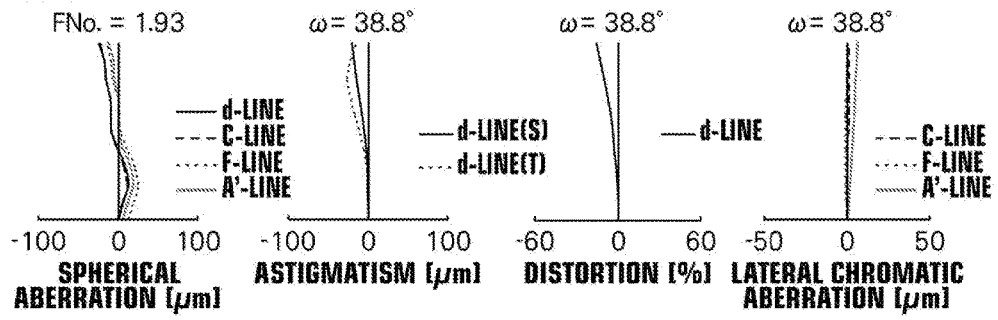
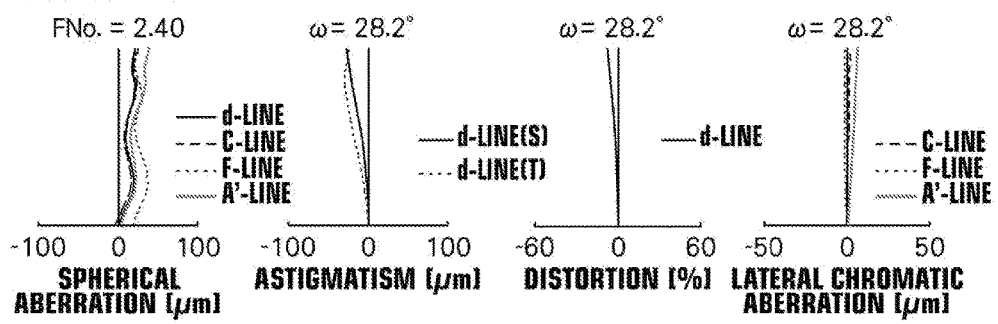

FIG.13
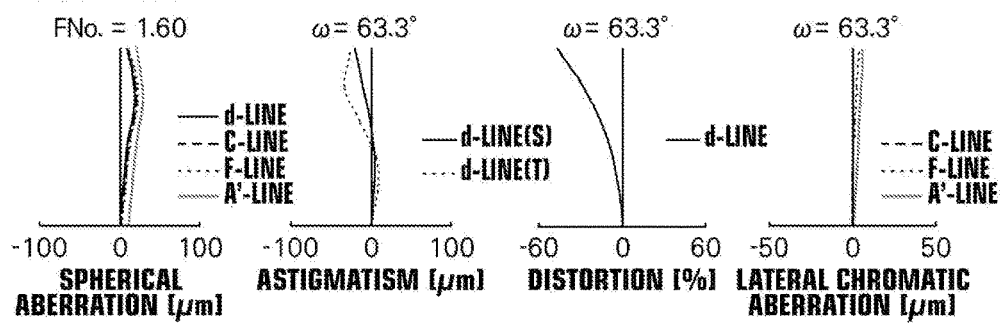
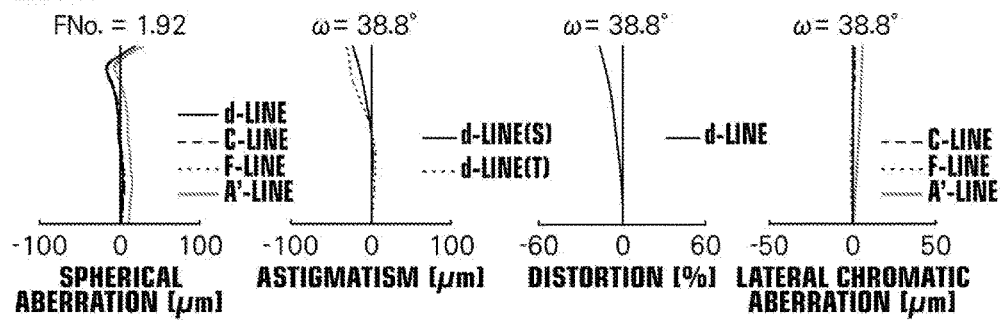
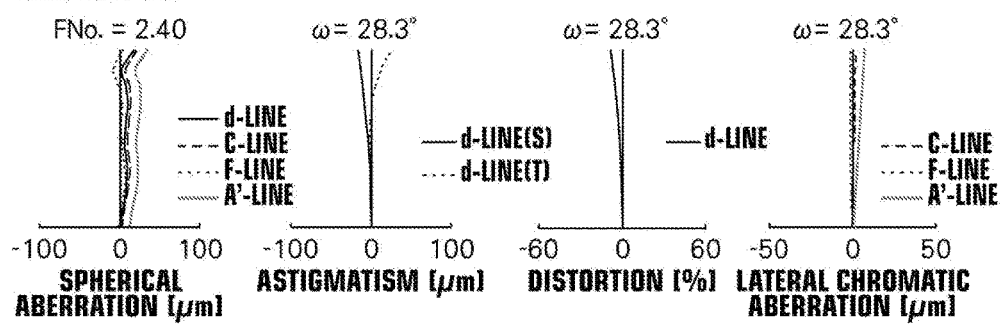

FIG.14
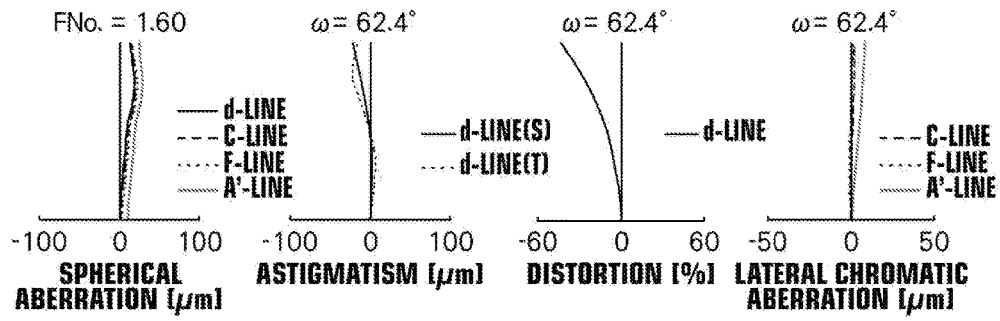
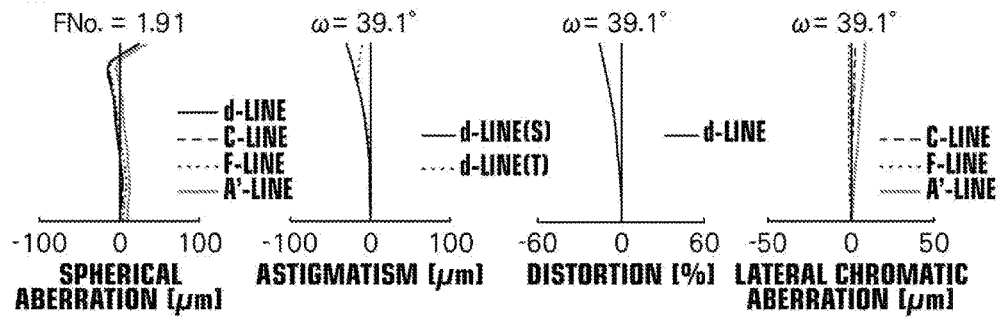
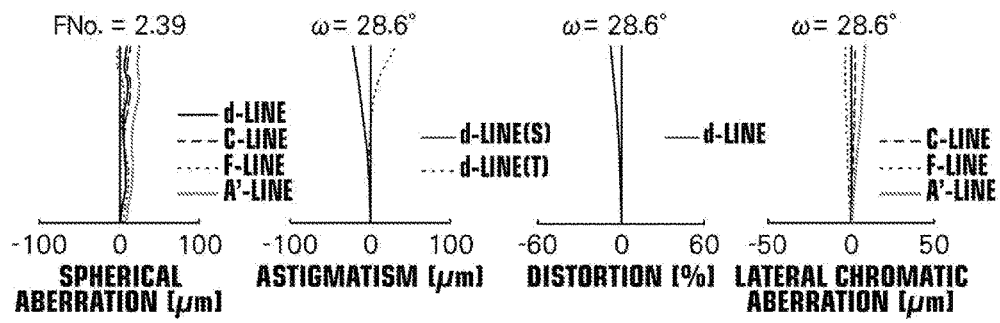

FIG.15
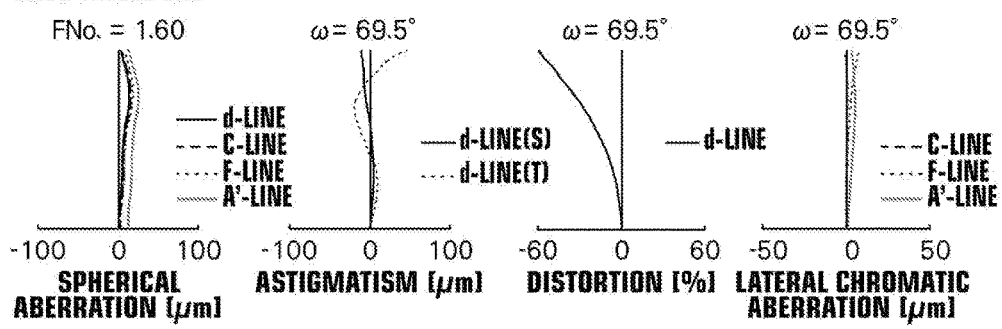
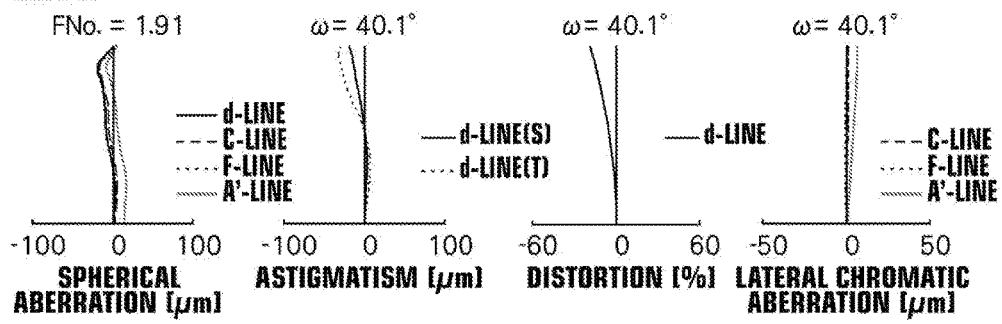
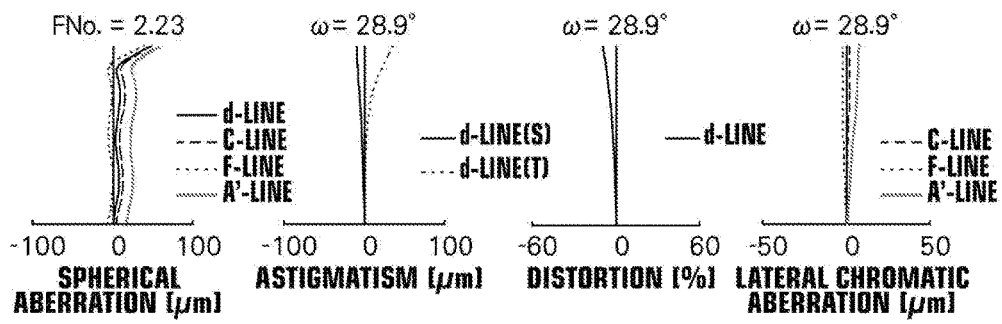

FIG.16
EXAMPLE 7
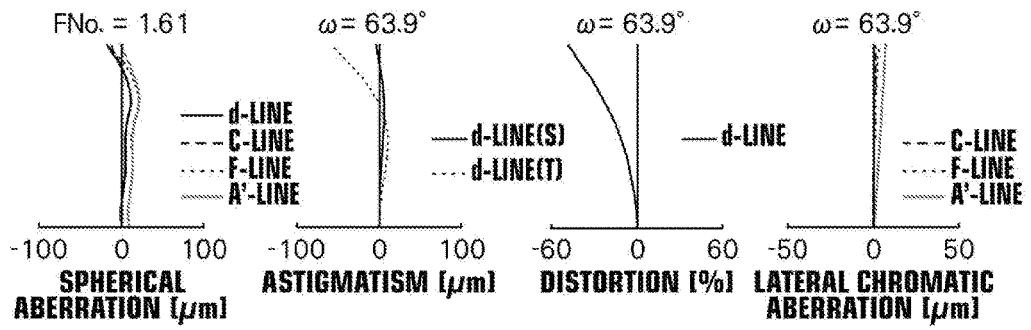
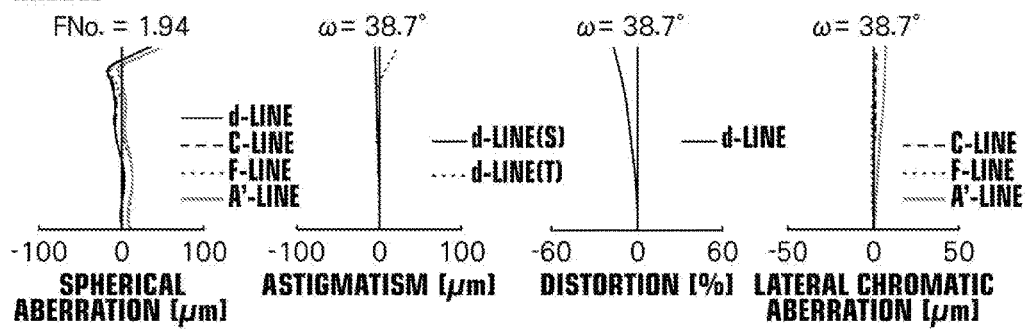
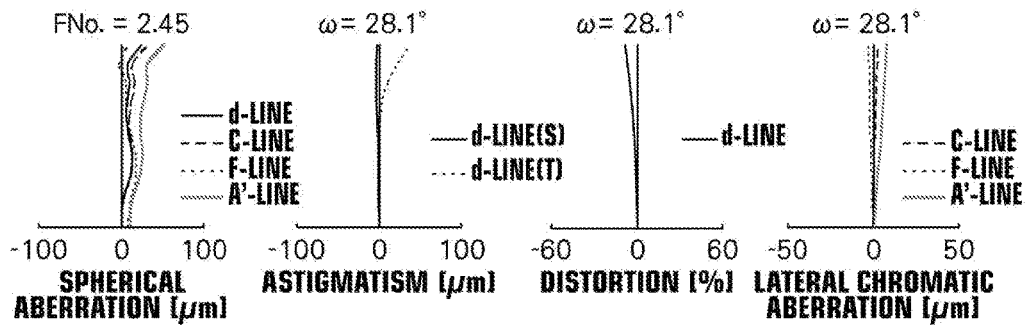

FIG.17
EXAMPLE 8
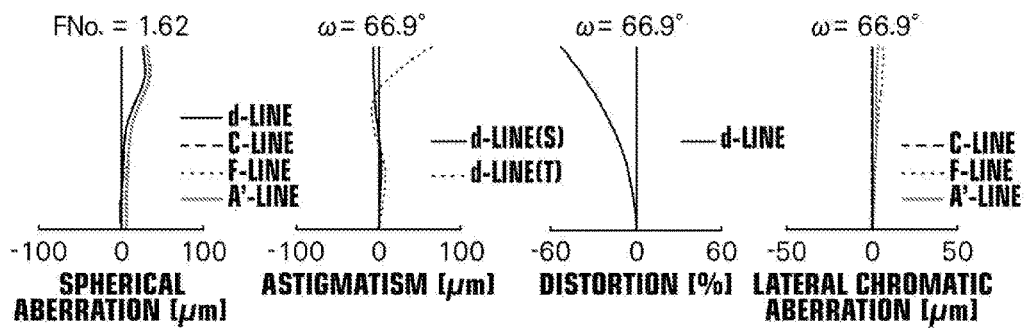
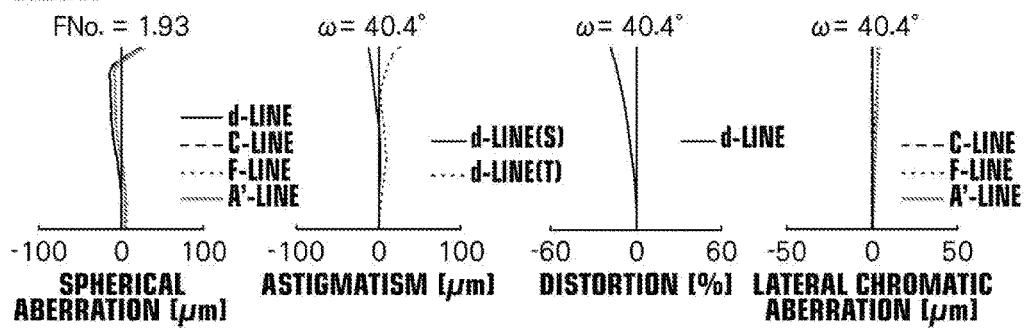
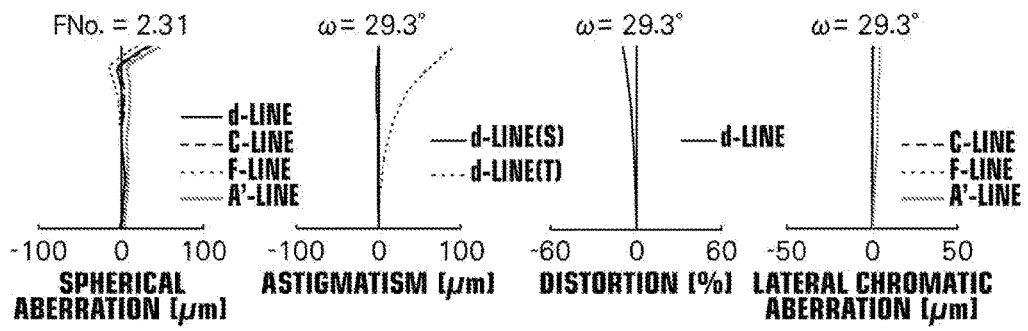

VARIABLE MAGNIFICATION OPTICAL SYSTEM AND IMAGING APPARATUS

CROSS-REFERENCE TO RELATED APPLICATIONS

The present application claims priority under 35 U.S.C. §119 to Japanese Patent Application No. 2014-108716, filed on May 27, 2014. The above application is hereby expressly incorporated by reference, in its entirety, into the present application.

BACKGROUND OF THE INVENTION

Field of the Invention

The present invention relates to a variable magnification optical system usable in a video camera, an electronic still camera or the like, and an imaging apparatus. In particular, the present invention relates to a variable magnification optical system that is appropriate especially for a surveillance camera and usable in a wide wavelength band of from a visible range to a near-infrared range, and an imaging apparatus including the variable magnification optical system.

Description of the Related Art

Conventionally, surveillance cameras were used for prevention of crimes, recording and the like. An optical system for such a surveillance camera needs to be structurable in small size and at low cost, and to have a large relative aperture to identify a subject even in low illumination imaging conditions and also high optical performance.

Further, surveillance cameras for both day and night are installed often in unattended facilities, and imaging in visible light is performed during day time, and imaging in near-infrared light is performed at night. Therefore, the optical system for such a surveillance camera needs to maintain high optical performance by excellent correction of chromatic aberrations in a wide wavelength band of from a visible range to a near-infrared range.

As a variable magnification optical system in which chromatic aberrations are excellently corrected from a visible range to a near-infrared range, for example, an optical system disclosed in International Patent Publication No. 2012/153505 (Patent Document 1) is known. The optical system disclosed in Patent Document 1 includes a negative first lens group and a positive second lens group in this order from the object side. The optical system is configured in such a manner that magnification is changed by changing a distance between the two lens groups and correction of the position of an image plane necessitated by the change in magnification is performed by moving the first lens group.

SUMMARY OF THE INVENTION

Cameras including imaging devices with pixel numbers of 5 million or more became available in recent years also for use as surveillance cameras. Therefore, a request for video images with even higher image qualities is increasing. Further, an optical system used for surveillance needs to maintain high optical performance from a visible light range to a near-infrared range.

In view of the foregoing circumstances, it is an object of the present invention to provide a variable magnification optical system having high optical performance from a visible light range to a near-infrared range and an imaging apparatus including this variable magnification optical system.

A variable magnification optical system of the present invention consists of a first lens group having negative refractive power, a stop, and a second lens group having positive refractive power in this order from an object side. The variable magnification optical system is configured to change magnification by changing a distance between the first lens group and the second lens group in an optical axis direction and to perform correction of the position of an image plane necessitated by the change in magnification by moving the first lens group in the optical axis direction. The first lens group comprises an L11 negative meniscus lens, an L12 negative lens and a C11 cemented lens, in which a biconcave lens and a positive lens are cemented together in this order from the object side, in this order from the object side. The second lens group comprises an L21 positive lens that is arranged closest to the object side and includes at least one aspheric surface, and an object-side surface of which is convex, and only two cemented lenses toward an image side of the L21 positive lens, and each of which consists of a negative lens and a positive lens cemented together in this order from the object side. One of the cemented lenses closer to the object side is a C21 cemented lens and the other one of the cemented lenses closer to the image side is a C22 cemented lens. Further, the following conditional expressions (1) and (2) are satisfied:

$$-1.0 < Rf11/Rf12 < 0.7 \qquad (1); \text{ and}$$

$$55.0 < v\text{dave}1 \qquad (2), \text{ where}$$

Rf11: a curvature radius of an object-side surface of the L11 negative meniscus lens, Rf12: a curvature radius of an object-side surface of the L12 negative lens, and vdave1: an average of Abbe numbers for d-line of negative lenses arranged toward the object side of the positive lens constituting the C11 cemented lens.

It is more desirable that the following conditional expression (1-1) is satisfied:

$$0 < Rf11/Rf12 < 0.7 \qquad (1-1).$$

In the variable magnification optical system, it is desirable that the following conditional expression (3) is satisfied. It is more desirable that the following conditional expression (3-1) is satisfied:

$$2.00 < T2/STR2 < 3.20 \qquad (3); \text{ and}$$

$$2.00 < T2/STR2 < 3.00 \qquad (3-1), \text{ where}$$

T2: a distance from a vertex of a surface closest to the object side in the second lens group to a vertex of a surface closest to the image side in the second lens group, and STR2: a movement amount of the second lens group from a wide-angle end to a telephoto end.

Further, it is desirable that the following conditional expressions (4) and (5) are satisfied. It is more desirable that the following conditional expression (4-1) or (4-2) is satisfied:

$$1.47 < ndC21n < 1.60 \qquad (4);$$

$$1.47 < ndC21n < 1.50 \qquad (4-1);$$

$$1.47 < ndC21n < 1.49 \qquad (4-2); \text{ and}$$

$$1.70 < ndC22n < 2.00 \qquad (5), \text{ where}$$

ndC21n: a refractive index for d-line of the negative lens constituting the C21 cemented lens, and ndC22n: a refractive index for d-line of the negative lens constituting the C22 cemented lens.

Further, it is desirable that the following conditional expression (6) is satisfied:

$$70.0 < \nu dC21\text{ave} \qquad (6),$$

where

νdC21ave: an average of Abbe numbers for d-line of the two lenses constituting the C11 cemented lens.

Further, it is desirable that the C21 cemented lens and the C22 cemented lens have positive refractive power.

Further, it is desirable that the following conditional expression (7) is satisfied:

$$|\theta CA'C21n - \theta CA'C21p| < 0.02 \qquad (7),$$

where

θCA'C21n: a partial dispersion ratio of C-line and A'-line of the negative lens constituting the C21 cemented lens, and θCA'C21p: a partial dispersion ratio of C-line and A'-line of the positive lens constituting the C21 cemented lens.

Here, a partial dispersion ratio of C-line and A'-line means a constant obtained by the following equation about refractive indices nC, nA' and nF for C-line, A'-line and F-line:

$$\theta CA' = (nC - nA')/(nF - nC).$$

Further, it is desirable that the variable magnification optical system further comprises a negative meniscus lens toward the image side of the C11 cemented lens, and an object-side surface of which is concave.

Further, it is desirable that the second lens group consists of five lenses of a positive lens including at least one aspheric surface, a cemented lens consisting of a negative meniscus lens having a concave image-side surface and a biconvex lens, and a cemented lens consisting of a negative meniscus lens having a concave image-side surface and a biconvex lens in this order from the object side.

An imaging apparatus of the present invention comprises the aforementioned variable magnification optical system of the present invention.

Here, the expression "consists of" means that lenses essentially without any refractive power, optical elements other than lenses, such as a stop, a mask, a cover glass and filters, mechanical parts, such as a lens flange, a lens barrel, an imaging device and a hand shake blur correction mechanism, and the like may be included in addition to the mentioned composition elements.

Further, the surface shape and the sign of the refractive power of the aforementioned lens are considered in a paraxial region when the lens includes an aspheric surface.

A variable magnification optical system of the present invention consists of a first lens group having negative refractive power, a stop, and a second lens group having positive refractive power in this order from an object side. The variable magnification optical system is configured to change magnification by changing a distance between the first lens group and the second lens group in an optical axis direction and to perform correction of the position of an image plane necessitated by the change in magnification by moving the first lens group in the optical axis direction. The first lens group comprises an L11 negative meniscus lens, an L12 negative lens and a C11 cemented lens, in which a biconcave lens and a positive lens are cemented together in this order from the object side, in this order from the object side. The second lens group comprises an L21 positive lens that is arranged closest to the object side and includes at least one aspheric surface, and an object-side surface of which is convex, and only two cemented lenses toward an image side of the L21 positive lens, and each of which consists of a negative lens and a positive lens cemented together in this order from the object side. One of the cemented lenses closer to the object side is a C21 cemented lens and the other one of the cemented lenses closer to the image side is a C22 cemented lens. Further, the following conditional expressions (1) and (2) are satisfied. Therefore, it is possible to give high optical performance to the variable magnification optical system from a visible light range to a near-infrared range:

$$-1.0 < Rf11/Rf12 < 0.7 \qquad (1); \text{ and}$$

$$55.0 < \nu d\text{ave}1 \qquad (2).$$

The imaging apparatus of the present invention comprises the variable magnification optical system of the present invention. Therefore, it is possible to obtain high image-quality images.

BRIEF DESCRIPTION OF THE DRAWINGS

FIG. 10 is aberration diagrams of the variable magnification optical system in Example 1 of the present invention;

FIG. 11 is aberration diagrams of the variable magnification optical system in Example 2 of the present invention;

FIG. 12 is aberration diagrams of the variable magnification optical system in Example 3 of the present invention;

FIG. 13 is aberration diagrams of the variable magnification optical system in Example 4 of the present invention;

FIG. 14 is aberration diagrams of the variable magnification optical system in Example 5 of the present invention;

FIG. 15 is aberration diagrams of the variable magnification optical system in Example 6 of the present invention;

FIG. 16 is aberration diagrams of the variable magnification optical system in Example 7 of the present invention;

FIG. 17 is aberration diagrams of the variable magnification optical system in Example 8 of the present invention.

DESCRIPTION OF THE PREFERRED EMBODIMENTS

Figure 1:
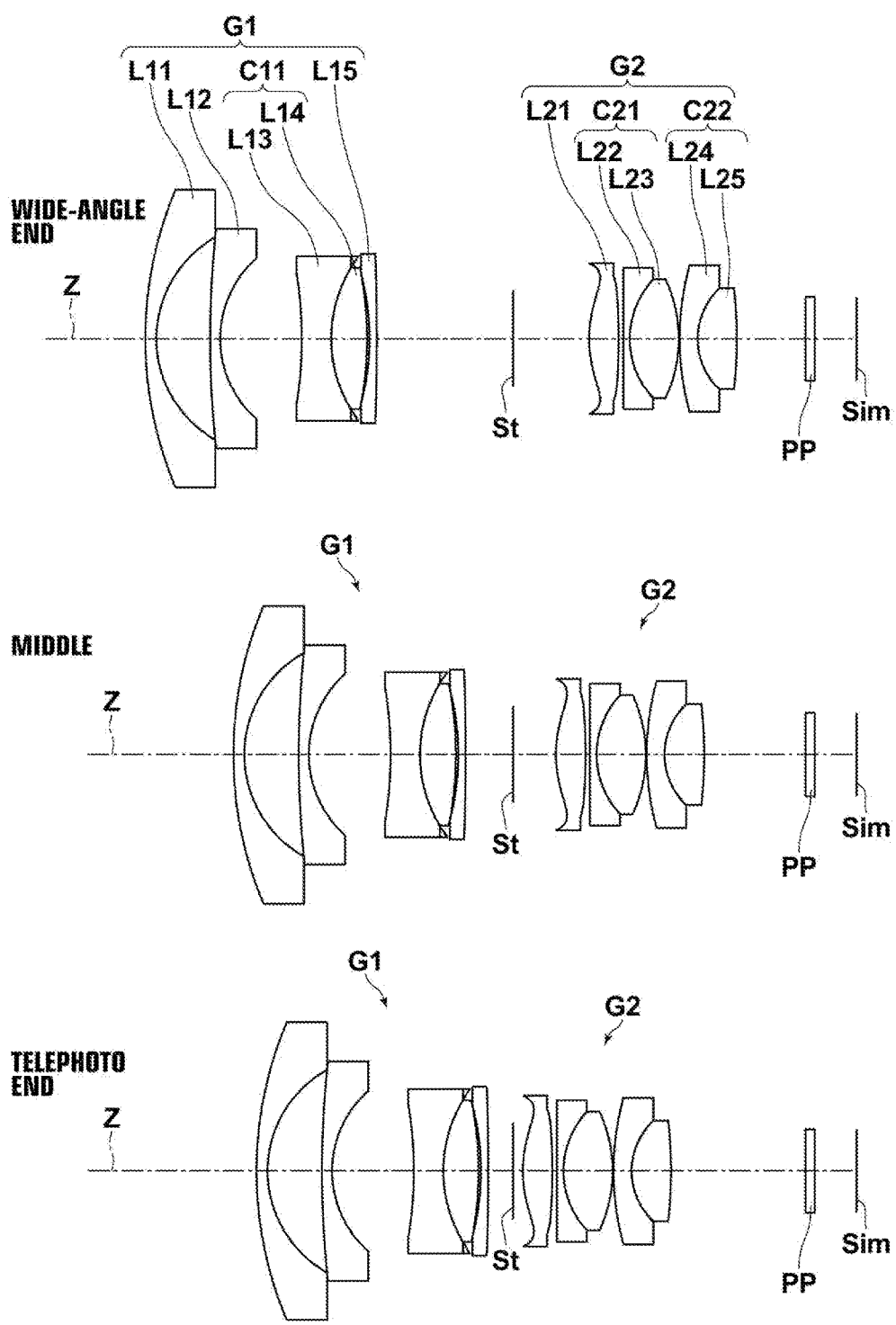
FIG. 1 is a cross section illustrating the lens configuration of a variable magnification optical system according to an embodiment of the present invention (also Example 1)
Figure 2:
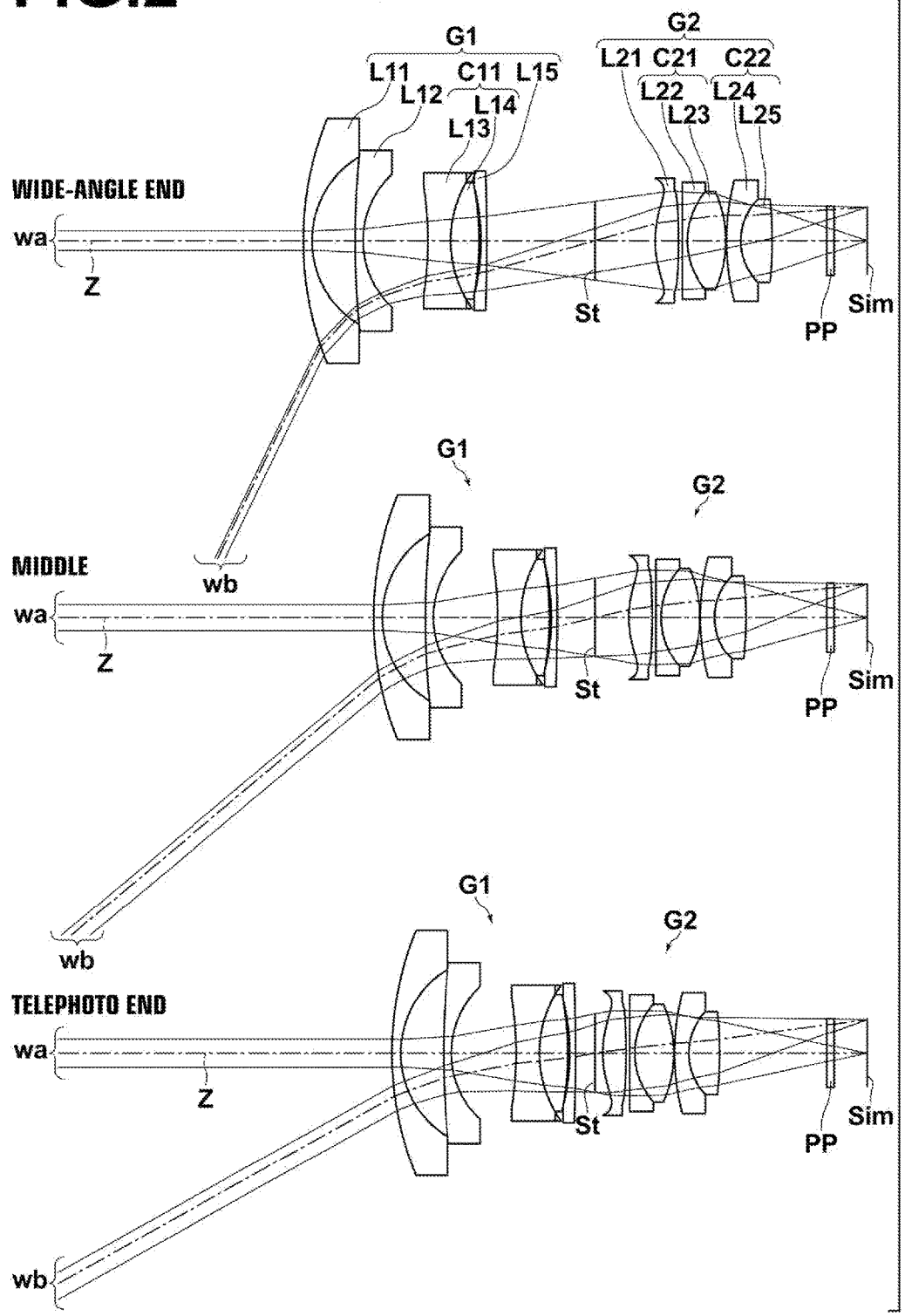
FIG. 2 is a diagram illustrating optical paths of the variable magnification optical system according to an embodiment of the present invention (also Example 1)

Hereinafter, embodiments of the present invention will be described in detail with reference to drawings. FIG. 1 is a cross section illustrating the lens configuration of a variable magnification optical system according to an embodiment of the present invention. FIG. 2 is a diagram illustrating optical paths of the variable magnification optical system. The example of configuration illustrated in FIG. 1 and FIG. 2 is also the configuration of a variable magnification optical system in Example 1, which will be described later. In FIG. 1 and FIG. 2, the left side is an object side, and the right side is an image side. Illustrated stop St does not necessarily represent the size nor the shape of the stop, but the position of the stop on optical axis Z. In FIG. 2, axial rays wa and rays wb at a maximum angle of view are also illustrated.

As illustrated in FIG. 1, this variable magnification optical system consists of first lens group G1 having negative refractive power, stop St, and second lens group G2 having positive refractive power in this order from the object side. The variable magnification optical system is configured to change magnification by changing a distance between first lens group G1 and second lens group G2 in an optical axis direction and to perform correction of the position of an image plane necessitated by the change in magnification by moving first lens group G1 in the optical axis direction.

When this variable magnification optical system is applied to an imaging apparatus, it is desirable to arrange a cover glass, a prism, and various filters, such as an infrared ray cut filter and a low-pass filter, between the optical system and image plane Sim based on the configuration of the camera side on which the lens is mounted. Therefore, FIG. 1 and FIG. 2 illustrate an example in which parallel-flat-plate-shaped optical member PP, which is assumed to be such elements, is arranged between the lens system and image plane Sim.

First lens group G1 comprises L11 negative meniscus lens L11, L12 negative lens L12 and C11 cemented lens C11, in which biconcave lens L13 and positive lens L14 are cemented together in this order from the object side, in this order from the object side.

When first lens group G1 starts at L11 negative meniscus lens L11 sequentially from the object side, as described above, it is possible to suppress an increase of astigmatism in a variable magnification range on the wide angle side. Further, when C11 cemented lens C11 is arranged toward the image side of two negative lenses L11 and L12, it is possible to excellently correct a lateral chromatic aberration in a variable magnification range on the wide angle side. Further, it is possible to excellently correct a longitudinal chromatic aberration in a variable magnification range on the telephoto side.

Second lens group G2 comprises L21 positive lens L21 that is arranged closest to the object side and includes at least one aspheric surface, and an object-side surface of which is convex, and only two cemented lenses toward an image side of this L21 positive lens L21, and each of which consists of a negative lens and a positive lens cemented together in this order from the object side (one of these cemented lenses closer to the object side is C21 cemented lens C21 and the other one of these cemented lenses closer to the image side is C22 cemented lens C22).

When positive refractive power is arranged closest to the object side in second lens group G2, as described above, axial rays entering second lens group G2 in a dispersed state are changed to converging rays. Therefore, it is possible to prevent the diameter of second lens group G2 from becoming large. Further, when two cemented lenses C21 and C22 are arranged in such a manner to follow L21 positive lens L21, correction of a longitudinal chromatic aberration and a lateral chromatic aberration becomes easy. Further, C21 cemented lens C21, which is closer to the object side, has a high ability of correcting especially a longitudinal chromatic aberration, and C22 cemented lens C22, which is arranged closer to the image side, has a high ability of correcting especially a lateral chromatic aberration. Therefore, it is possible to easily balance a longitudinal chromatic aberration and a lateral chromatic aberration, as compared with a case in which only one cemented lens is arranged.

Further, the variable magnification optical system is configured to satisfy the following conditional expressions (1) and (2). When the value is not lower than or equal to the lower limit of conditional expression (1), it is possible to suppress distortion at a wide-angle end. When the value is not higher than or equal to the upper limit of conditional expression (1), it is possible to suppress curvature of field. Therefore, it is possible to contribute to improvement in peripheral performance. When the value is not lower than or equal to the lower limit of conditional expression (2), it is possible to suppress a lateral chromatic aberration. Therefore, it is possible to easily cope with an increase in pixel numbers of imaging devices. When the variable magnification optical system satisfies the following conditional expression (1-1), more excellent characteristics are achievable:

$$-1.0 < Rf11/Rf12 < 0.7 \qquad (1);$$

$$0 < Rf11/Rf12 < 0.7 \qquad (1\text{-}1);$$

$$55.0 < vdave1 \qquad (2), \text{ where}$$

Rf11: a curvature radius of an object-side surface of the L11 negative meniscus lens, Rf12: a curvature radius of an object-side surface of the L12 negative lens, and vdave1: an average of Abbe numbers for d-line of negative lenses arranged toward the object side of the positive lens constituting the C11 cemented lens.

In the variable magnification optical system according to an embodiment of the present invention, it is desirable that the following conditional expression (3) is satisfied. When the value is not lower than or equal to the lower limit of conditional expression (3), it is possible to suppress a movement amount of second lens group G2. Therefore, it is possible to contribute to reduction in the size of the optical system. When the value is not higher than or equal to the upper limit of conditional expression (3), it is possible to suppress the refractive power of second lens group G2. Therefore, it is possible to suppress a spherical aberration. Consequently, it is possible to maintain high optical optical performance. When the variable magnification optical system satisfies the following conditional expression (3-1), more excellent characteristics are achievable:

$$2.00 < T2/STR2 < 3.20 \qquad (3); \text{ and}$$

$$2.00 < T2/STR2 < 3.00 \qquad (3\text{-}1), \text{ where}$$

T2: a distance from a vertex of a surface closest to the object side in the second lens group to a vertex of a surface closest to the image side in the second lens group, and STR2: a movement amount of the second lens group from a wide-angle end to a telephoto end.

Further, it is desirable that the following conditional expressions (4) and (5) are satisfied. When the value is not lower than or equal to the lower limit of conditional expression (4), it is possible to use various kinds of lens material. Therefore, it is possible to easily correct a longitudinal chromatic aberration, and to maintain excellent performance from a visible range to a near-infrared range. When the value is not higher than or equal to the upper limit of conditional expression (4), it is possible to suppress curvature of field. Therefore, it is possible to contribute to improvement in peripheral performance. Further, when the value is not lower than or equal to the lower limit of conditional expression (5), it is possible to suppress a lateral chromatic aberration. Therefore, it is possible to contribute to improvement in peripheral performance about colors. When the value is not higher than or equal to the upper limit of conditional expression (5), it is possible to suppress curvature of field. Therefore, it is possible to contribute to improvement in peripheral performance. When the following conditional expression (4-1) or (4-2) is satisfied, more excellent characteristics are achievable:

$$1.47 < ndC21n < 1.60 \quad (4);$$

$$1.47 < ndC21n < 1.50 \quad (4\text{-}1);$$

$$1.47 < ndC21n < 1.49 \quad (4\text{-}2); \text{ and}$$

$$1.70 < ndC22n < 2.00 \quad (5), \text{ where}$$

ndC21n: a refractive index for d-line of the negative lens constituting the C21 cemented lens, and ndC22n: a refractive index for d-line of the negative lens constituting the C22 cemented lens Further, it is desirable that the following conditional expression (6) is satisfied. When the value is not lower than or equal to the lower limit of conditional expression (6), it is possible to excellently correct a longitudinal chromatic aberration from a visible range to a near-infrared range. Therefore, it is possible to maintain excellent optical performance:

$$70.0 < vdC21ave \quad (6), \text{ where}$$

vdC21ave: an average of Abbe numbers for d-line of the two lenses constituting the C11 cemented lens.

Further, it is desirable that the C21 cemented lens C21 and the C22 cemented lens C22 have positive refractive power. When the variable magnification optical system is configured in this manner, it is possible to suppress a spherical aberration even if an F-number at a wide-angle end is reduced. Consequently, it is possible to maintain high optical performance.

Further, it is desirable that the following conditional expression (7) is satisfied. When the value is not higher than or equal to the upper limit of conditional expression (7), it is possible to easily correct a longitudinal chromatic aberration from a visible range to near-infrared range. Therefore, it is possible to excellently maintain optical performance:

$$|\theta CA'C21n - \theta CA'C21p| < 0.02 \quad (7), \text{ where}$$

θCA'C21n: a partial dispersion ratio of C-line and A'-line of the negative lens constituting the C21 cemented lens, and θCA'C21p: a partial dispersion ratio of C-line and A'-line of the positive lens constituting the C21 cemented lens.

Further, it is desirable that negative meniscus lens L15 an object-side surface of which is concave is arranged toward the image side of C11 cemented lens C11. When the variable magnification optical system is configured in this manner, axial marginal rays at a telephoto end are nearly perpendicular to a lens surface both at entrance and at exit. Therefore, it is possible to add negative refractive power to first lens group G1 without greatly affecting a spherical aberration at the telephoto end. Further, fine-tuning of a lateral chromatic aberration and astigmatism at the wide-angle end is possible by an air lens between the image-side surface of C11 cemented lens C11 and negative meniscus lens L15.

Further, it is desirable that second lens group G2 consists of five lenses of positive lens L21 including at least one aspheric surface, C21 cemented lens C21 consisting of negative meniscus lens L22 having a concave image-side surface and biconvex lens L23, and C22 cemented lens C22 consisting of negative meniscus lens L24 having a concave image-side surface and biconvex lens L25 in this order from the object side. When both of the cemented surfaces of the two cemented lenses have concave surfaces facing the image side in this manner, axial marginal rays enter the cemented surfaces at angles that are nearly perpendicular to the surfaces. Therefore, a difference in spherical aberrations according to wavelengths does not tend to be generated. Further, even if the number of lenses in second lens group G2 is small, sufficient optical performance is achievable.

In the variable magnification optical system according to an embodiment of the present invention, it is desirable that glass is used as a specific material arranged closest to the object side. Alternatively, transparent ceramic may be used.

When the variable magnification optical system according to an embodiment of the present embodiment is used in tough conditions, it is desirable that a multi-layer coating for protection is applied. Besides the coating for protection, an anti-reflection coating for reducing ghost light or the like during usage may be applied.

In the example illustrated in FIG. 1 and FIG. 2, optical member PP is arranged between the lens system and image plane Sim. Instead of arranging various filters, such as a low-pass filter and a filter that cuts a specific wavelength band, or the like between the lens system and image plane Sim, these various filters may be arranged between lenses. Alternatively, a coating having similar action to that of various filters may be applied to a lens surface of one of the lenses.

Next, numerical value examples of the variable magnification optical system of the present invention will be described.

First, numerical values about the variable magnification optical system in Example 1 will be described. FIG. 1 is a cross section illustrating the lens configuration of the variable magnification optical system in Example 1. In FIG. 1 and FIGS. 3 through 9 corresponding to Examples 2 through 8, which will be described later, the left side is an object side, and the right side is an image side. Illustrated stop St does not necessarily represent the size nor the shape of the stop, but the position of the stop on optical axis Z.

In the variable magnification optical system of Example 1, first lens group G1 consists of L11 negative meniscus lens L11, L12 negative lens L12, C11 cemented lens C11 and negative meniscus lens L15 an object-side surface of which is concave in this order from the object side. Second lens group G2 consists of positive lens L21 including at least one aspheric surface and two cemented lenses C21 and C22 in this order from the object side.

Table 1 shows basic lens data on a variable magnification optical system in Example 1. Table 2 shows data about specification. Table 3 shows data about moving surface distances. Table 4 shows data about aspherical coefficients. Next, the meanings of signs in the tables will be described by using the tables of Example 1, as examples. The meanings of the signs in the tables of Examples 2 through 8 are basically similar to Example 1.

In the lens data of Table 1, the column of surface numbers shows surface numbers. A surface of a composition element closest to the object side is the first surface, and the surface numbers sequentially increase toward the image side. The column of curvature radii shows a curvature radius of each surface. The column of surface distances shows a distance, on optical axis Z, between each surface and its next surface. The column of n shows the refractive index for d-line (wavelength is 587.6 nm) of each optical element. The column of ν shows the Abbe number for d-line (wavelength is 587.6 nm) of each optical element. The column of θCA' shows a partial dispersion ratio of C-line and A'-line of each optical element.

The sign of a curvature radius is positive when the shape of a surface is convex toward the object side, and negative when the shape of a surface is convex toward the image side. The basic lens data include stop St and optical member PP. In the column of surface numbers, the term "(STOP)" is written in a row of a surface number of a surface corresponding to stop St together with the surface number. Further, in the lens data of Table 1, "DD[surface number]" is written in a row of each surface distance that changes during magnification change. Numerical values corresponding to this DD[surface number] are shown in Table 3.

The data about specification in Table 2 show zoom ratios, focal length f', back focus Bf', F-number FNo. and full angle of view 2ω.

In the basic lens data, the data about specification and the data about moving surface distances, degree is used as the unit of angle, and mm is used as the unit of length. However, since an optical system is usable by being proportionally enlarged or proportionally reduced, other appropriate units may be used.

In the lens data of Table 1, mark * is attached to the surface number of an aspheric surface. Table 1 shows the numerical value of a paraxial curvature radius, as the curvature radius of the aspheric surface. The data about aspherical coefficients in Table 4 show surface numbers of aspheric surfaces and aspherical coefficients about these aspheric surfaces. The aspherical coefficients are values of coefficients KA, Am (m=3 . . . 10) in an aspherical equation represented by the following equation:

$$Zd = C \cdot h^2 / \{1 + (1 - KA \cdot C^2 \cdot h^2)^{1/2}\} + \Sigma Am \cdot h^m, \text{ where}$$

Zd: the depth of an aspheric surface (the length of a perpendicular from a point on the aspheric surface at height h to a flat plane that contacts with the vertex of the aspheric surface and is perpendicular to the optical axis), h: height (a length from the optical axis),
C: the reciprocal of a paraxial curvature radius, and
KA, Am: aspherical coefficients (m=3 . . . 10).

TABLE 1

EXAMPLE 1·LENS DATA (n, ν FOR d-LINE)

| SURFACE NUMBER | CURVATURE RADIUS | SURFACE DISTANCE | n | ν | θCA' |
|---|---|---|---|---|---|
| 1 | 41.8638 | 1.2000 | 1.58313 | 59.38 | |
| 2 | 12.7415 | 5.9200 | | | |
| 3 | 110.0711 | 1.1000 | 1.62041 | 60.29 | |
| 4 | 11.7529 | 8.9000 | | | |
| 5 | −45.1104 | 3.2100 | 1.59522 | 67.74 | |
| 6 | 15.0840 | 3.9000 | 1.74950 | 35.28 | |
| 7 | −38.8036 | 0.2600 | | | |
| 8 | −28.0067 | 0.8000 | 1.71700 | 47.92 | |
| 9 | −258.5570 | DD[9] | | | |
| 10(STOP) | ∞ | DD[10] | | | |
| *11 | 13.2964 | 3.2100 | 1.49710 | 81.56 | |
| *12 | −65.5128 | 0.5100 | | | |
| 13 | ∞ | 0.7100 | 1.48749 | 70.23 | 0.3633 |

TABLE 1-continued

EXAMPLE 1·LENS DATA (n, ν FOR d-LINE)

| SURFACE NUMBER | CURVATURE RADIUS | SURFACE DISTANCE | n | ν | θCA' |
|---|---|---|---|---|---|
| 14 | 9.5530 | 5.3500 | 1.49700 | 81.54 | 0.3501 |
| 15 | −15.4133 | 0.1000 | | | |
| 16 | 30.3341 | 1.9700 | 1.80100 | 34.97 | |
| 17 | 7.5760 | 4.3100 | 1.49700 | 81.54 | |
| 18 | −49.2267 | DD[18] | | | |
| 19 | ∞ | 1.0000 | 1.51633 | 64.14 | |
| 20 | ∞ | 4.5418 | | | |

TABLE 2

EXAMPLE 1·SPECIFICATION (d-LINE)

| | WIDE-ANGLE END | MIDDLE | TELEPHOTO END |
|---|---|---|---|
| ZOOM RATIO | 1.0 | 1.6 | 2.2 |
| f' | 4.16 | 6.58 | 8.99 |
| Bf' | 12.70 | 16.31 | 19.92 |
| FNo. | 1.60 | 1.93 | 2.41 |
| 2ω[°] | 126.6 | 77.6 | 56.6 |

TABLE 3

EXAMPLE 1·ZOOM DISTANCE

| | WIDE-ANGLE END | MIDDLE | TELEPHOTO END |
|---|---|---|---|
| DD[9] | 14.8900 | 5.2252 | 2.6956 |
| DD[10] | 8.2800 | 4.6691 | 1.0581 |
| DD[18] | 7.5000 | 11.1109 | 14.7219 |

TABLE 4

EXAMPLE 1·ASPHERICAL COEFFICIENT

| SURFACE NUMBER | 11 | 12 |
|---|---|---|
| KA | 1.4271945E+00 | −7.3171805E+00 |
| A3 | 0.0000000E+00 | 0.0000000E+00 |
| A4 | −6.7044059E−05 | 1.6689319E−04 |
| A5 | −4.9133089E−05 | −5.9818843E−05 |
| A6 | 9.3050441E−06 | 7.8579544E−06 |
| A7 | −1.1604890E−06 | 4.7505228E−07 |
| A8 | 1.3435898E−07 | −1.2472304E−07 |
| A9 | −2.1016328E−08 | −1.9681347E−08 |
| A10 | 6.8453571E−11 | 1.8261761E−09 |

FIG. 10 illustrates aberration diagrams of the variable magnification optical system in Example 1. Here, the top row in Table 10 illustrates a spherical aberration, astigmatism, distortion and a lateral chromatic aberration at a wide angle end in this order from the left side. The middle row in Table 10 illustrates a spherical aberration, astigmatism, distortion and a lateral chromatic aberration at a middle position in this order from the left side. The bottom row in Table 10 illustrates a spherical aberration, astigmatism, distortion and a lateral chromatic aberration at a telephoto end in this order from the left side. The aberration diagrams showing a spherical aberration, astigmatism and distortion illustrate aberrations for d-line (wavelength is 587.6 nm), as a reference wavelength. The spherical aberration diagram illustrates aberrations for d-line (wavelength is 587.6 nm), C-line (wavelength is 656.3 nm), F-line (wavelength is 486.1 nm) and A'-line (wavelength is 768.2 nm) by a solid line, a long broken line, a short broken line and a gray solid line, respectively. The astigmatism diagram illustrates an aberration in a sagittal direction and an aberration in a tangential direction by a solid line and a short broken line, respectively. The lateral chromatic aberration diagram illustrates aberrations for C-line (wavelength is 656.3 nm), F-line (wavelength is 486.1 nm) and A'-line (wavelength is 768.2 nm) by a long broken line, a short broken line and a gray solid line, respectively. In the spherical aberration diagram, FNo. means an F-number, and in the other diagrams, ω means a half angle of view.

Figure 3:
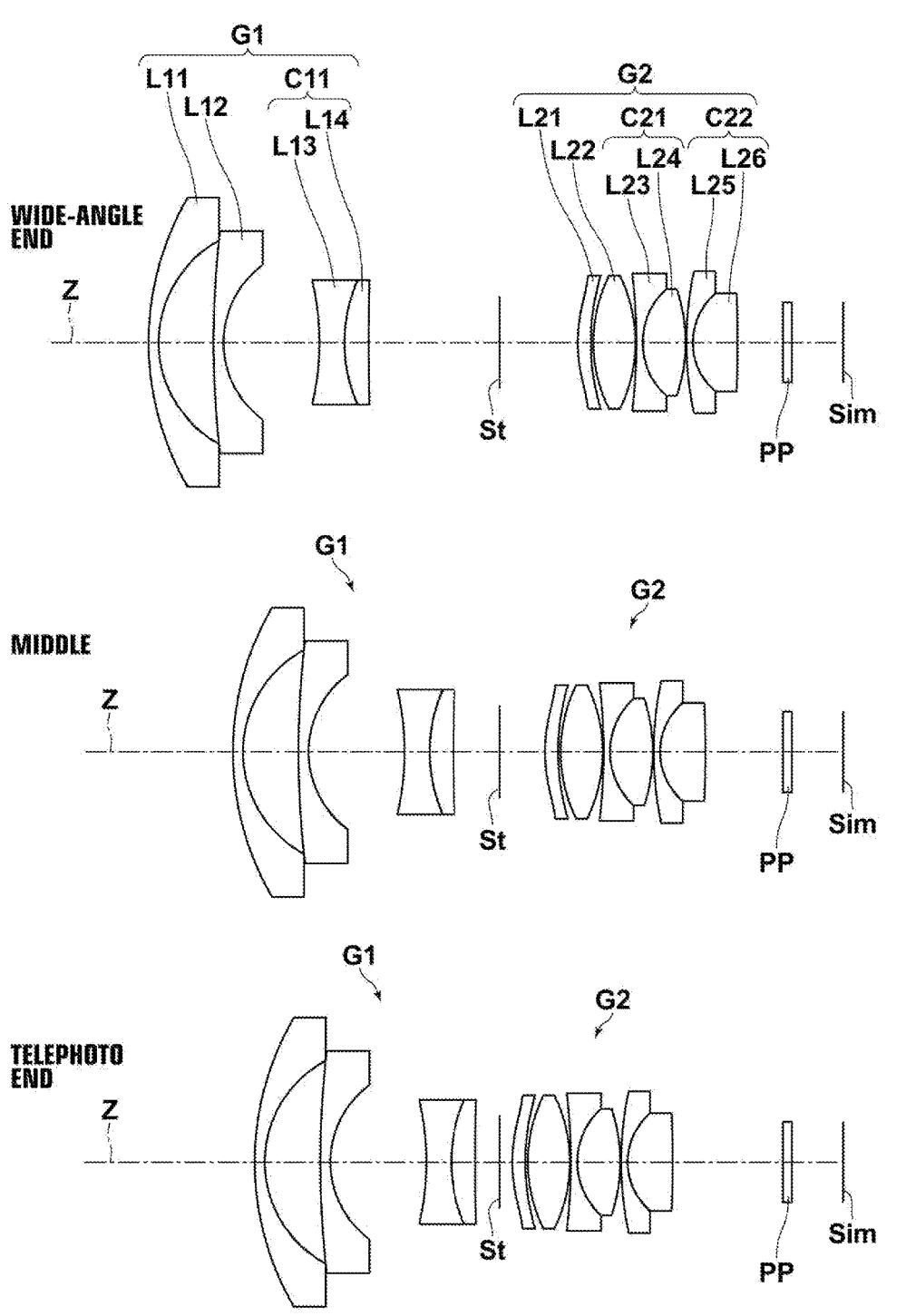
FIG. 3 is a cross section illustrating the lens configuration of a variable magnification optical system in Example 2 of the present invention.

Next, a variable magnification optical system in Example 2 will be described. In the variable magnification optical system of Example 2, first lens group G1 consists of L11 negative meniscus lens L11, L12 negative lens L12 and C11 cemented lens C11 in this order from the object side. Second lens group G2 consists of positive lens L21 including at least one aspheric surface, a biconvex lens L22 and two cemented lenses C21 and C22 in this order from the object side. FIG. 3 is a cross section illustrating the lens configuration of the variable magnification optical system in Example 2. Table 5 shows basic lens data on the variable magnification optical system in Example 2. Table 6 shows data about specification. Table 7 shows data about moving surface distances. Table 8 shows data about aspherical coefficients. FIG. 11 illustrates aberration diagrams.

TABLE 5

EXAMPLE 2•LENS DATA (n, ν FOR d-LINE)

| SURFACE NUMBER | CURVATURE RADIUS | SURFACE DISTANCE | n | ν | θCA' |
|---|---|---|---|---|---|
| 1 | 32.7341 | 1.1054 | 1.58313 | 59.38 | |
| 2 | 13.0911 | 6.1336 | | | |
| 3 | 110.4658 | 1.1000 | 1.63854 | 55.38 | |
| 4 | 10.8817 | 10.6009 | | | |
| 5 | −31.0454 | 2.7725 | 1.49700 | 81.54 | |
| 6 | 17.6271 | 2.6615 | 1.69895 | 30.13 | |
| 7 | 263.9315 | DD[7] | | | |
| 8(STOP) | ∞ | DD[8] | | | |
| *9 | 18.6916 | 1.4475 | 1.58313 | 59.46 | |
| *10 | 33.8720 | 0.2671 | | | |
| 11 | 17.2484 | 4.6397 | 1.49700 | 81.54 | |
| 12 | −17.2484 | 0.1000 | | | |
| 13 | −66.8501 | 0.7100 | 1.48749 | 70.23 | 0.3633 |
| 14 | 8.1704 | 4.7447 | 1.49700 | 81.54 | 0.3501 |
| 15 | −19.1018 | 0.1001 | | | |
| 16 | 38.6208 | 0.7100 | 1.80100 | 34.97 | |
| 17 | 7.2863 | 5.0000 | 1.49700 | 81.54 | |
| 18 | −123.3460 | DD[18] | | | |
| 19 | ∞ | 1.0000 | 1.51633 | 64.14 | |
| 20 | ∞ | 5.6484 | | | |

TABLE 6

EXAMPLE 2•SPECIFICATION (d-LINE)

| | WIDE-ANGLE END | MIDDLE | TELEPHOTO END |
|---|---|---|---|
| ZOOM RATIO | 1.0 | 1.6 | 2.2 |
| f | 4.14 | 6.55 | 8.96 |
| Bf | 11.31 | 14.92 | 18.53 |
| FNo. | 1.61 | 1.93 | 2.43 |
| 2ω[°] | 126.2 | 77.6 | 56.6 |

TABLE 7

EXAMPLE 2•ZOOM DISTANCE

| | WIDE-ANGLE END | MIDDLE | TELEPHOTO END |
|---|---|---|---|
| DD[7] | 14.5117 | 5.1128 | 2.7073 |
| DD[8] | 8.6343 | 5.0213 | 1.4083 |
| DD[18] | 5.0000 | 8.6130 | 12.2260 |

TABLE 8

EXAMPLE 2•ASPHERICAL COEFFICIENT

| SURFACE NUMBER | 9 | 10 |
|---|---|---|
| KA | 2.0020286E+00 | 6.0276367E+00 |
| A3 | 0.0000000E+00 | 3.1583495E−19 |
| A4 | 4.9313365E−05 | 2.5757255E−04 |
| A5 | −1.3890819E−05 | −3.5694604E−05 |
| A6 | −1.6962580E−06 | 4.4704710E−06 |
| A7 | 1.2139815E−06 | 1.0285347E−06 |
| A8 | −2.4774312E−07 | −4.2314109E−07 |
| A9 | −1.0428084E−08 | 1.9045260E−08 |
| A10 | 2.8732969E−09 | 1.5078890E−09 |

Figure 4:
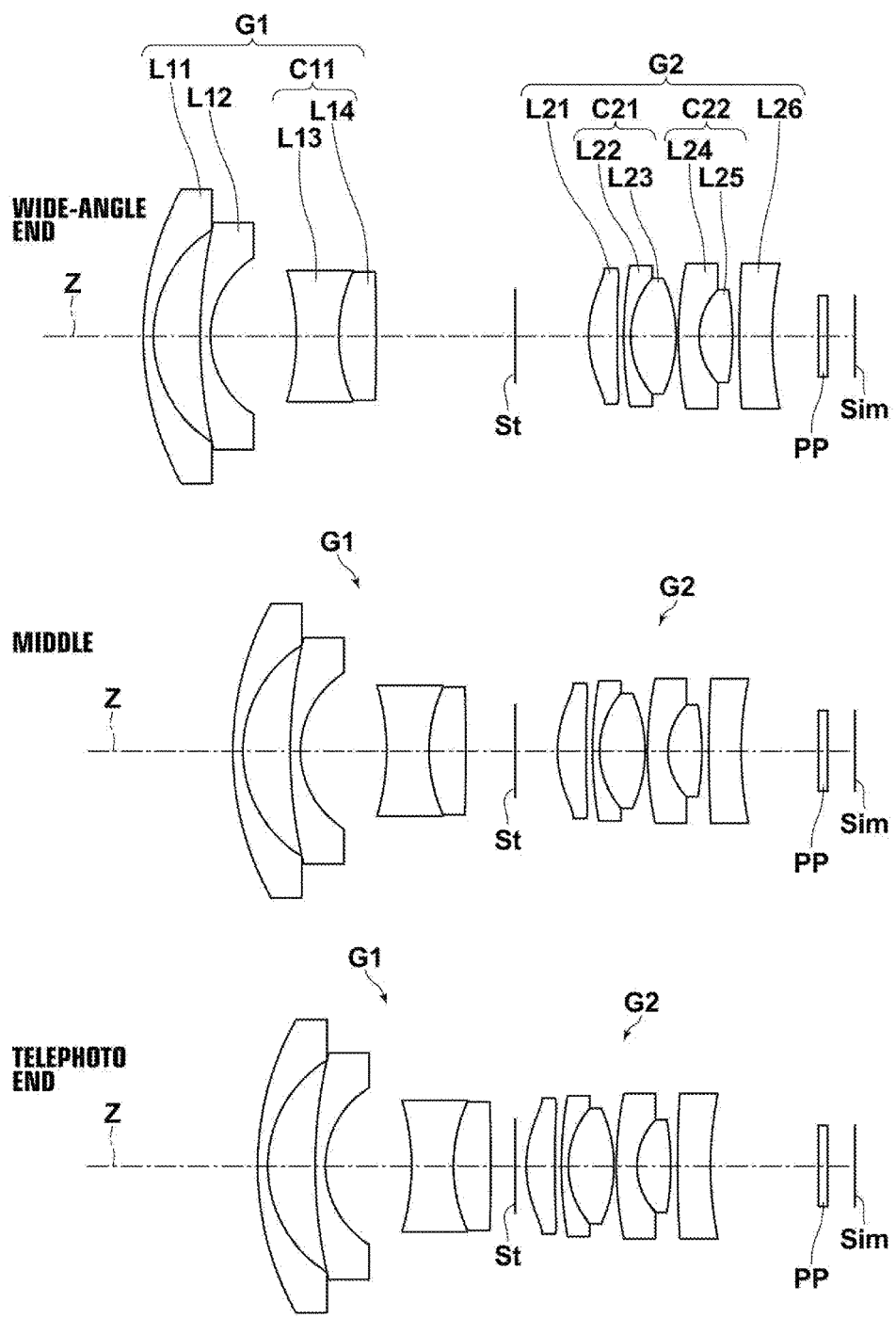
FIG. 4 is a cross section illustrating the lens configuration of a variable magnification optical system in Example 3 of the present invention.

Next, a variable magnification optical system in Example 3 will be described. In the variable magnification optical system of Example 3, first lens group G1 consists of L11 negative meniscus lens L11, L12 negative lens L12 and C11 cemented lens C11 in this order from the object side. Second lens group G2 consists of positive lens L21 including at least one aspheric surface, two cemented lenses C21 and C22 and negative meniscus lens L26 in this order from the object side. FIG. 4 is a cross section illustrating the lens configuration of the variable magnification optical system in Example 3. Table 9 shows basic lens data on the variable magnification optical system in Example 3. Table 10 shows data about specification. Table 11 shows data about moving surface distances. Table 12 shows data about aspherical coefficients. FIG. 12 illustrates aberration diagrams.

TABLE 9

EXAMPLE 3•LENS DATA (n, ν FOR d-LINE)

| SURFACE NUMBER | CURVATURE RADIUS | SURFACE DISTANCE | n | ν | θCA' |
|---|---|---|---|---|---|
| 1 | 33.6109 | 1.1000 | 1.58313 | 59.38 | |
| 2 | 13.8811 | 5.1479 | | | |
| 3 | 54.5220 | 1.1000 | 1.62041 | 60.29 | |
| 4 | 10.2456 | 9.3591 | | | |
| 5 | −25.6499 | 4.6054 | 1.59522 | 67.74 | |
| 6 | 17.1941 | 4.0501 | 1.73800 | 32.26 | |
| 7 | −257.1314 | DD[7] | | | |
| 8(STOP) | ∞ | DD[8] | | | |
| *9 | 12.9349 | 3.1313 | 1.49700 | 81.61 | |
| *10 | −311.8984 | 0.6768 | | | |
| 11 | 45.6652 | 0.7624 | 1.48749 | 70.23 | |
| 12 | 9.9025 | 4.9423 | 1.49700 | 81.54 | |
| 13 | −15.4488 | 0.2585 | | | 0.3633 |
| 14 | 39.0656 | 2.2483 | 1.80100 | 34.97 | 0.3501 |
| 15 | 7.4553 | 3.6807 | 1.49700 | 81.54 | |
| 16 | −30.2999 | 0.7395 | | | |
| 17 | 134.5225 | 3.5815 | 1.48749 | 70.23 | |
| 18 | 40.2076 | DD[18] | | | |
| 19 | ∞ | 1.0000 | 1.51633 | 64.14 | |
| 20 | ∞ | 2.9667 | | | |

TABLE 10

EXAMPLE 3·SPECIFICATION (d-LINE)

|  | WIDE-ANGLE END | MIDDLE | TELEPHOTO END |
|---|---|---|---|
| ZOOM RATIO | 1.0 | 1.6 | 2.2 |
| f | 4.15 | 6.56 | 8.98 |
| Bf | 8.63 | 12.01 | 15.39 |
| FNo. | 1.61 | 1.93 | 2.40 |
| 2ω[°] | 126.2 | 77.6 | 56.4 |

TABLE 11

EXAMPLE 3·ZOOM DISTANCE

|  | WIDE-ANGLE END | MIDDLE | TELEPHOTO END |
|---|---|---|---|
| DD[7] | 15.1567 | 5.3656 | 2.6549 |
| DD[8] | 7.9636 | 4.5810 | 1.1984 |
| DD[18] | 5.0000 | 8.3826 | 11.7652 |

TABLE 12

EXAMPLE 3·ASPHERICAL COEFFICIENT

| SURFACE NUMBER | 9 | 10 |
|---|---|---|
| KA | 5.7817064E−01 | −4.6443129E+01 |
| A3 | 0.0000000E+00 | 0.0000000E+00 |
| A4 | −4.3996971E−05 | 1.8585640E−04 |
| A5 | 3.7835462E−06 | −2.3767054E−05 |
| A6 | 3.8817849E−06 | 9.4383470E−06 |
| A7 | −1.8838967E−06 | −1.3218988E−06 |
| A8 | 2.6303017E−07 | −5.5573829E−08 |
| A9 | −8.1721041E−09 | 2.7717808E−08 |
| A10 | −1.2541756E−09 | −2.4435784E−09 |

Figure 5:
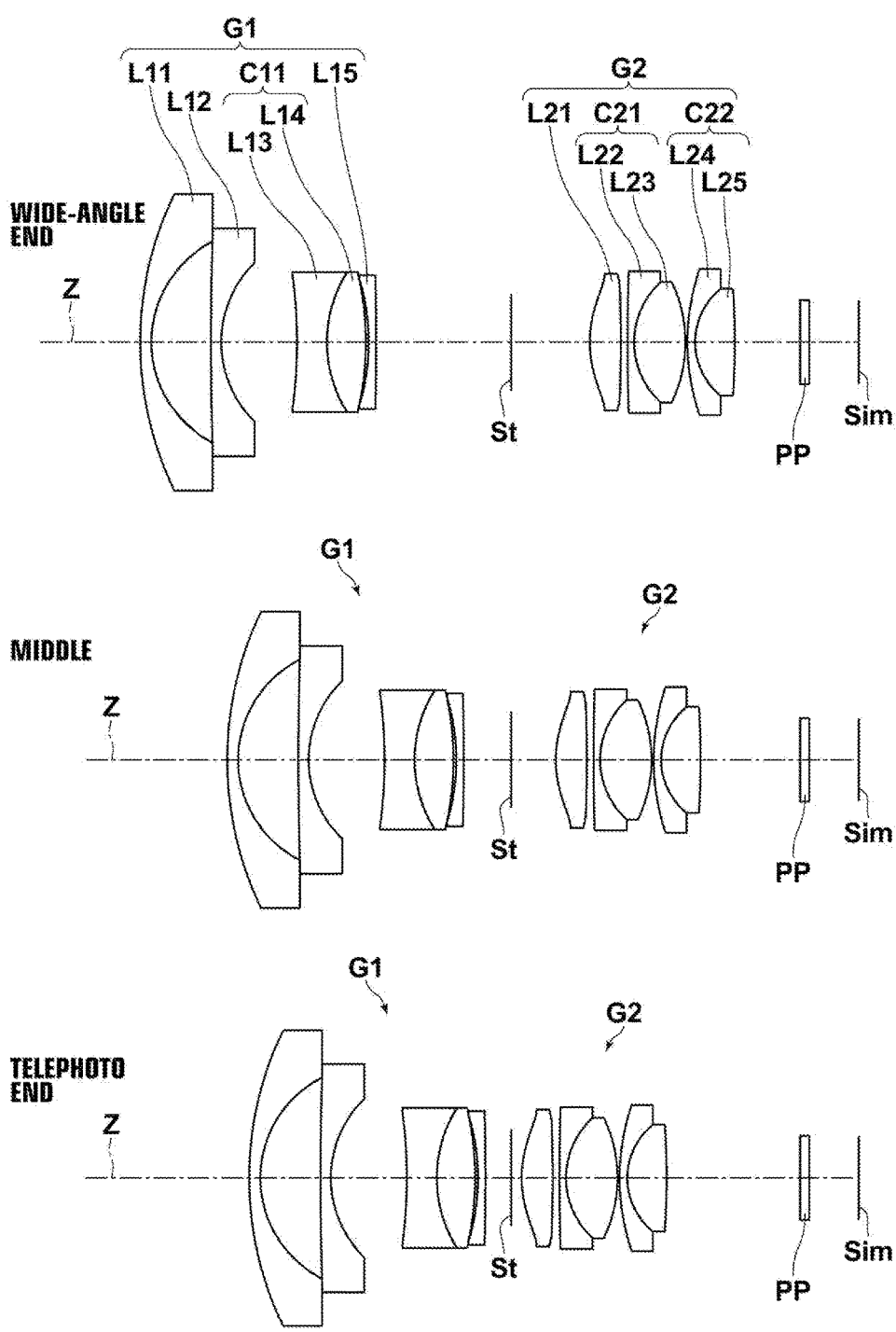
FIG. 5 is a cross section illustrating the lens configuration of a variable magnification optical system in Example 4 of the present invention.

Next, a variable magnification optical system in Example 4 will be described. The configuration of the variable magnification optical system in Example 4 is similar to that of the variable magnification optical system in Example 1. FIG. 5 is a cross section illustrating the lens configuration of the variable magnification optical system in Example 4. Table 13 shows basic lens data on the variable magnification optical system in Example 4. Table 14 shows data about specification. Table 15 shows data about moving surface distances. Table 16 shows data about aspherical coefficients. FIG. 13 illustrates aberration diagrams.

TABLE 13

EXAMPLE 4·LENS DATA (n, ν FOR d-LINE)

| SURFACE NUMBER | CURVATURE RADIUS | SURFACE DISTANCE | n | ν | θCA' |
|---|---|---|---|---|---|
| 1 | 37.7869 | 1.1998 | 1.58313 | 59.38 |  |
| 2 | 12.4808 | 6.4967 |  |  |  |
| 3 | 403.3100 | 1.1042 | 1.62041 | 60.29 |  |
| 4 | 12.2516 | 8.1915 |  |  |  |
| 5 | −54.9632 | 3.2327 | 1.59522 | 67.74 |  |
| 6 | 14.5682 | 4.1983 | 1.74950 | 35.28 |  |
| 7 | −33.2960 | 0.2999 |  |  |  |
| *8 | −23.9469 | 0.8000 | 1.71700 | 47.92 |  |
| *9 | −349.0909 | DD[9] |  |  |  |
| 10(STOP) | ∞ | DD[10] |  |  |  |
| *11 | 12.8129 | 3.3474 | 1.49700 | 81.61 |  |
| *12 | −102.2554 | 0.7274 |  |  |  |
| 13 | 256.7987 | 0.7102 | 1.48749 | 70.23 | 0.3633 |
| 14 | 8.9999 | 5.5462 | 1.49700 | 81.54 | 0.3501 |
| 15 | −15.4159 | 0.2194 |  |  |  |
| 16 | 24.9887 | 0.8334 | 1.80100 | 34.97 |  |

TABLE 13-continued

EXAMPLE 4·LENS DATA (n, ν FOR d-LINE)

| SURFACE NUMBER | CURVATURE RADIUS | SURFACE DISTANCE | n | ν | θCA' |
|---|---|---|---|---|---|
| 17 | 7.5482 | 4.2582 | 1.49700 | 81.54 |  |
| 18 | −93.3786 | DD[18] |  |  |  |
| 19 | ∞ | 1.0000 | 1.51633 | 64.14 |  |
| 20 | ∞ | 5.3346 |  |  |  |

TABLE 14

EXAMPLE 4·SPECIFICATION (d-LINE)

|  | WIDE-ANGLE END | MIDDLE | TELEPHOTO END |
|---|---|---|---|
| ZOOM RATIO | 1.0 | 1.6 | 2.2 |
| f | 4.16 | 6.58 | 8.99 |
| Bf | 13.10 | 16.77 | 20.45 |
| FNo. | 1.60 | 1.92 | 2.40 |
| 2ω[°] | 126.6 | 77.6 | 56.6 |

TABLE 15

EXAMPLE 4·ZOOM DISTANCE

|  | WIDE-ANGLE END | MIDDLE | TELEPHOTO END |
|---|---|---|---|
| DD[9] | 14.6300 | 5.1848 | 2.7894 |
| DD[10] | 8.4727 | 4.8012 | 1.1296 |
| DD[18] | 7.1084 | 10.7799 | 14.4515 |

TABLE 16

EXAMPLE 4·ASPHERICAL COEFFICIENT

| SURFACE NUMBER | 8 | 9 |
|---|---|---|
| KA | 1.6108197E+00 | 4.5489876E+00 |
| A3 | 0.0000000E+00 | 0.0000000E+00 |
| A4 | 1.4270929E−05 | 7.1190181E−06 |
| A5 | −2.7900525E−06 | −2.5973947E−06 |
| A6 | −1.5553082E−07 | −1.9389610E−07 |
| A7 | 1.1794428E−07 | 1.0841423E−07 |
| A8 | −4.7051041E−09 | −1.4409977E−09 |
| A9 | −1.2658749E−09 | −1.2427174E−09 |
| A10 | 8.5040811E−11 | 5.1002719E−11 |

| SURFACE NUMBER | 11 | 12 |
|---|---|---|
| KA | 1.4904083E+00 | −2.0203289E+01 |
| A3 | 0.0000000E+00 | 0.0000000E+00 |
| A4 | −5.3246660E−05 | 1.8317645E−04 |
| A5 | −4.8042049E−05 | −5.6955866E−05 |
| A6 | 1.1995285E−05 | 1.3086312E−05 |
| A7 | −1.7531330E−06 | −1.1509988E−06 |
| A8 | 9.9307511E−08 | −4.7496322E−08 |
| A9 | −1.7491619E−09 | 6.6934664E−09 |
| A10 | −6.0392098E−10 | −3.1180552E−10 |

Figure 6:
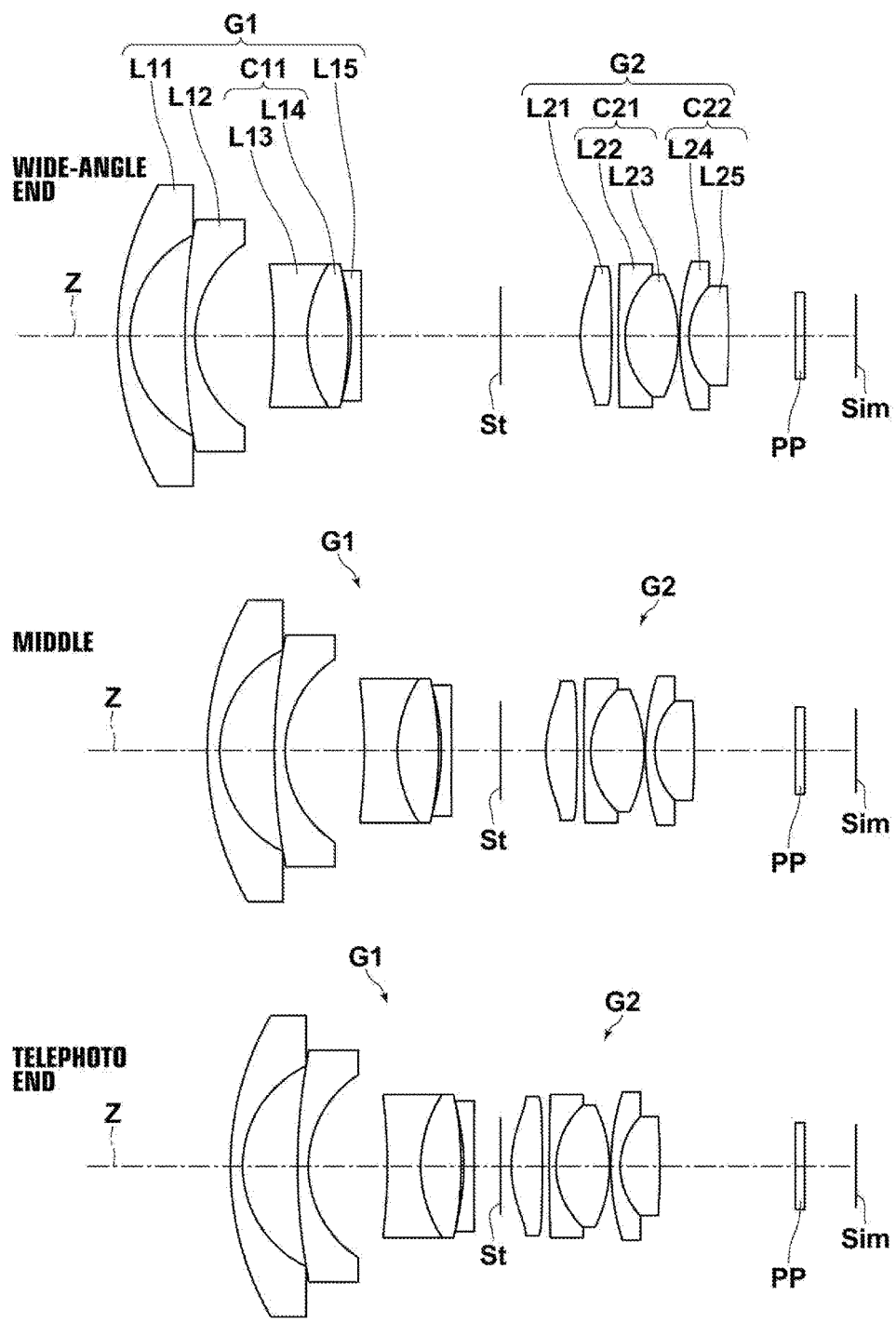
FIG. 6 is a cross section illustrating the lens configuration of a variable magnification optical system in Example 5 of the present invention.

Next, a variable magnification optical system in Example 5 will be described. The configuration of the variable magnification optical system in Example 5 is similar to that of the variable magnification optical system in Example 1. FIG. 6 is a cross section illustrating the lens configuration of the variable magnification optical system in Example 5. Table 17 shows basic lens data on the variable magnification optical system in Example 5. Table 18 shows data about specification. Table 19 shows data about moving surface distances. Table 20 shows data about aspherical coefficients. FIG. 14 illustrates aberration diagrams.

TABLE 17

EXAMPLE 5·LENS DATA (n, ν FOR d-LINE)

| SURFACE NUMBER | CURVATURE RADIUS | SURFACE DISTANCE | n | ν | θCA' |
|---|---|---|---|---|---|
| 1 | 32.7699 | 1.3146 | 1.71299 | 53.87 | |
| 2 | 12.1207 | 5.8219 | | | |
| 3 | 65.5408 | 1.1307 | 1.62041 | 60.29 | |
| 4 | 11.8566 | 8.3780 | | | |
| 5 | −62.2035 | 3.5325 | 1.59522 | 67.74 | |
| 6 | 14.2879 | 4.3440 | 1.74950 | 35.28 | |
| 7 | −34.3900 | 0.2916 | | | |
| *8 | −22.3051 | 1.0847 | 1.71700 | 47.92 | |
| *9 | −293.9954 | DD[9] | | | |
| 10(STOP) | ∞ | DD[10] | | | |
| *11 | 13.1546 | 3.3051 | 1.49700 | 81.61 | |
| *12 | −96.4129 | 0.7237 | | | |
| 13 | 300.4382 | 0.7100 | 1.48749 | 70.23 | 0.3633 |
| 14 | 8.9984 | 5.6574 | 1.49700 | 81.54 | 0.3501 |
| 15 | −14.9174 | 0.1498 | | | |
| 16 | 26.6900 | 0.9931 | 1.80100 | 34.97 | |
| 17 | 7.7740 | 4.2079 | 1.49700 | 81.54 | |
| 18 | −82.4609 | DD[18] | | | |
| 19 | ∞ | 1.0000 | 1.51633 | 64.14 | |
| 20 | ∞ | 5.4125 | | | |

TABLE 18

EXAMPLE 5·SPECIFICATION (d-LINE)

| | WIDE-ANGLE END | MIDDLE | TELEPHOTO END |
|---|---|---|---|
| ZOOM RATIO | 1.0 | 1.6 | 2.2 |
| f | 4.09 | 6.47 | 8.85 |
| Bf | 13.18 | 16.84 | 20.50 |
| FNo. | 1.60 | 1.91 | 2.39 |
| 2ω[°] | 124.8 | 78.2 | 57.2 |

TABLE 19

EXAMPLE 5·ZOOM DISTANCE

| | WIDE-ANGLE END | MIDDLE | TELEPHOTO END |
|---|---|---|---|
| DD[9] | 14.7989 | 5.2427 | 2.7893 |
| DD[10] | 8.4649 | 4.8055 | 1.1462 |
| DD[18] | 7.1084 | 10.7678 | 14.4271 |

TABLE 20

EXAMPLE 5·ASPHERICAL COEFFICIENT

| SURFACE NUMBER | 8 | 9 |
|---|---|---|
| KA | −3.6777651E−01 | 4.6198668E+00 |
| A3 | 0.0000000E+00 | 0.0000000E+00 |
| A4 | 1.0942410E−04 | 1.2179437E−04 |
| A5 | −1.9063239E−05 | −2.6473859E−05 |
| A6 | 6.8187844E−07 | 3.4330657E−06 |
| A7 | 6.2129908E−07 | 1.6002858E−07 |
| A8 | −9.2366784E−08 | −7.2804966E−08 |
| A9 | −2.9226259E−09 | 1.5322403E−09 |
| A10 | 6.9715323E−10 | 2.0178266E−10 |

| SURFACE NUMBER | 11 | 12 |
|---|---|---|
| KA | 1.4897634E+00 | −1.7500925E+01 |
| A3 | 0.0000000E+00 | 0.0000000E+00 |
| A4 | −7.3730815E−05 | 1.5411423E−04 |
| A5 | −3.7186320E−05 | −3.8875354E−05 |
| A6 | 1.1311053E−05 | 1.0504451E−05 |
| A7 | −1.9469049E−06 | −1.1725287E−06 |
| A8 | 1.2331748E−07 | −1.7561052E−08 |
| A9 | −2.2801119E−09 | 4.6579345E−09 |
| A10 | −5.7214951E−10 | −2.4510441E−10 |

Figure 7:
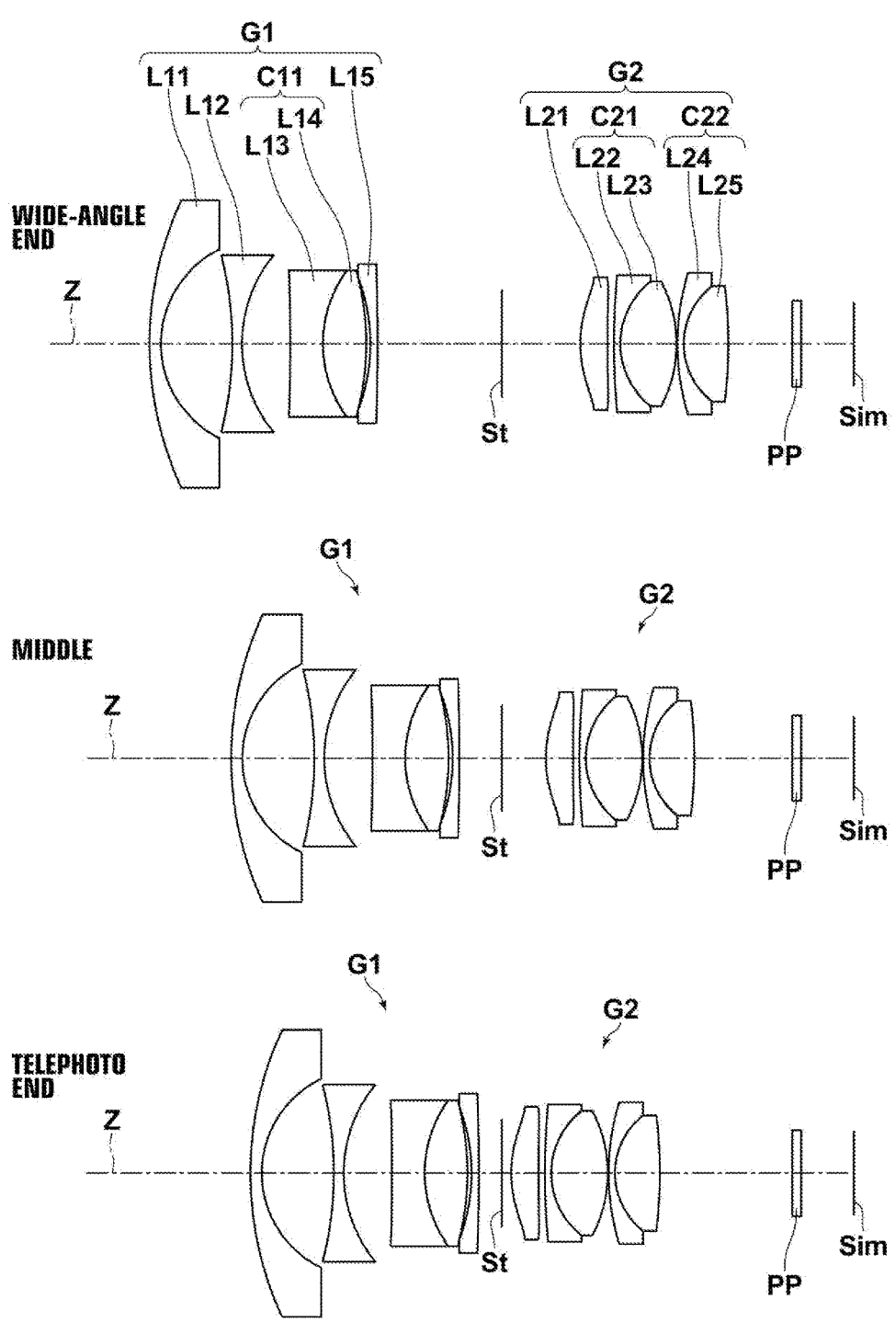
FIG. 7 is a cross section illustrating the lens configuration of a variable magnification optical system in Example 6 of the present invention.

Next, a variable magnification optical system in Example 6 will be described. The configuration of the variable magnification optical system in Example 6 is similar to that of the variable magnification optical system in Example 1. FIG. 7 is a cross section illustrating the lens configuration of the variable magnification optical system in Example 6. Table 21 shows basic lens data on the variable magnification optical system in Example 6. Table 22 shows data about specification. Table 23 shows data about moving surface distances. Table 24 shows data about aspherical coefficients. FIG. 15 illustrates aberration diagrams.

TABLE 21

EXAMPLE 6·LENS DATA (n, ν FOR d-LINE)

| SURFACE NUMBER | CURVATURE RADIUS | SURFACE DISTANCE | n | ν | θCA' |
|---|---|---|---|---|---|
| 1 | 39.1682 | 1.2557 | 1.58313 | 59.38 | |
| 2 | 11.9367 | 8.0002 | | | |
| 3 | −40.9507 | 1.1000 | 1.62041 | 60.29 | |
| 4 | 15.9873 | 5.3628 | | | |
| 5 | −239.6179 | 3.6342 | 1.59522 | 67.74 | |
| 6 | 14.2196 | 4.8016 | 1.74950 | 35.28 | |
| 7 | −31.3549 | 0.4611 | | | |
| 8 | −21.2945 | 0.7999 | 1.71700 | 47.92 | |
| 9 | −255.3739 | DD[9] | | | |
| 10(STOP) | ∞ | DD[10] | | | |
| *11 | 13.8831 | 3.0420 | 1.49700 | 81.61 | |
| *12 | −651.6013 | 0.6998 | | | |
| 13 | 87.6872 | 0.7099 | 1.48749 | 70.23 | 0.3633 |
| 14 | 9.0000 | 6.2592 | 1.49700 | 81.54 | 0.3501 |
| 15 | −15.2321 | 0.1002 | | | |
| 16 | 27.6832 | 0.7099 | 1.80100 | 34.97 | |
| 17 | 8.3511 | 5.0001 | 1.49700 | 81.54 | |
| 18 | −55.9069 | DD[18] | | | |
| 19 | ∞ | 1.0000 | 1.51633 | 64.14 | |
| 20 | ∞ | 5.8366 | | | |

TABLE 22

EXAMPLE 6·SPECIFICATION (d-LINE)

| | WIDE-ANGLE END | MIDDLE | TELEPHOTO END |
|---|---|---|---|
| ZOOM RATIO | 1.0 | 1.6 | 2.2 |
| f | 4.29 | 6.78 | 9.27 |
| Bf | 13.60 | 17.44 | 21.27 |
| FNo. | 1.60 | 1.91 | 2.23 |
| 2ω[°] | 139.0 | 80.2 | 57.8 |

TABLE 23

EXAMPLE 6·ZOOM DISTANCE

| | WIDE-ANGLE END | MIDDLE | TELEPHOTO END |
|---|---|---|---|
| DD[9] | 13.8605 | 4.7254 | 2.5612 |
| DD[10] | 8.7193 | 4.8844 | 1.0495 |
| DD[18] | 7.1084 | 10.9433 | 14.7782 |

TABLE 24

EXAMPLE 6·ASPHERICAL COEFFICIENT

| SURFACE NUMBER | 11 | 12 |
|---|---|---|
| KA | 1.7030831E+00 | −2.4199601E+01 |
| A3 | 0.0000000E+00 | 0.0000000E+00 |
| A4 | −2.0500246E−05 | 2.0792829E−04 |
| A5 | −6.2226932E−05 | −6.8472439E−05 |
| A6 | 1.6766528E−05 | 1.6969096E−05 |
| A7 | −2.2520806E−06 | −1.4947657E−06 |
| A8 | 6.2580122E−08 | −1.0046894E−07 |
| A9 | 7.7127363E−09 | 1.8371151E−08 |
| A10 | −8.9400754E−10 | −8.1008144E−10 |

Figure 8:
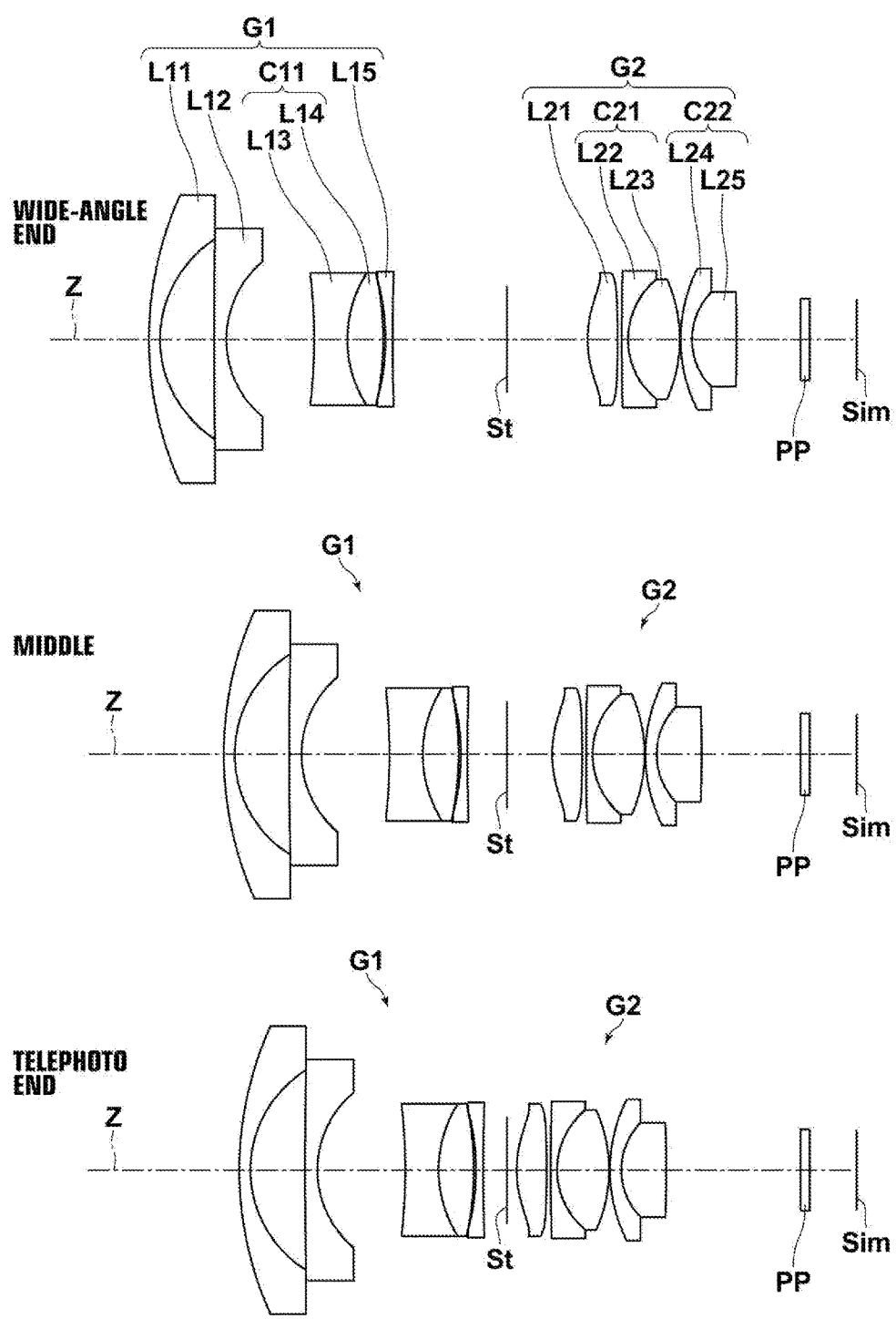
FIG. 8 is a cross section illustrating the lens configuration of a variable magnification optical system in Example 7 of the present invention.

Next, a variable magnification optical system in Example 7 will be described. The configuration of the variable magnification optical system in Example 7 is similar to that of the variable magnification optical system in Example 1. FIG. 8 is a cross section illustrating the lens configuration of the variable magnification optical system in Example 7. Table 25 shows basic lens data on the variable magnification optical system in Example 7. Table 26 shows data about specification. Table 27 shows data about moving surface distances. Table 28 shows data about aspherical coefficients. FIG. 16 illustrates aberration diagrams.

TABLE 25

EXAMPLE 7·LENS DATA (n, ν FOR d-LINE)

| SURFACE NUMBER | CURVATURE RADIUS | SURFACE DISTANCE | n | ν | θCA' |
|---|---|---|---|---|---|
| 1 | 39.9687 | 1.2290 | 1.58313 | 59.38 | |
| 2 | 13.4591 | 6.0686 | | | |
| 3 | 722.4131 | 1.3505 | 1.62041 | 60.29 | |
| 4 | 11.5685 | 9.7521 | | | |
| 5 | −65.7864 | 3.6924 | 1.59522 | 67.74 | |
| 6 | 14.1419 | 3.9692 | 1.74950 | 35.28 | |
| 7 | −35.3875 | 0.2498 | | | |
| 8 | −26.0952 | 0.7999 | 1.71700 | 47.92 | |
| 9 | 259.3302 | DD[9] | | | |
| 10(STOP) | ∞ | DD[10] | | | |
| *11 | 13.0008 | 3.3275 | 1.49700 | 81.61 | |
| *12 | −100.8438 | 0.4467 | | | |
| 13 | 342.5252 | 0.7100 | 1.48749 | 70.23 | 0.3633 |
| 14 | 8.9242 | 5.7528 | 1.49700 | 81.54 | 0.3501 |
| 15 | −16.9831 | 0.0998 | | | |
| 16 | 17.9964 | 1.2605 | 1.95375 | 32.32 | |
| 17 | 7.7504 | 5.0000 | 1.49700 | 81.54 | |
| 18 | −171.9245 | DD[18] | | | |
| 19 | ∞ | 1.0000 | 1.51633 | 64.14 | |
| 20 | ∞ | 5.2057 | | | |

TABLE 26

EXAMPLE 7·SPECIFICATION (d-LINE)

| | WIDE-ANGLE END | MIDDLE | TELEPHOTO END |
|---|---|---|---|
| ZOOM RATIO | 1.0 | 1.6 | 2.2 |
| f | 4.20 | 6.64 | 9.08 |
| Bf | 12.97 | 16.91 | 20.84 |
| FNo. | 1.61 | 1.94 | 2.45 |
| 2ω[°] | 127.8 | 77.4 | 56.2 |

TABLE 27

EXAMPLE 7·ZOOM DISTANCE

| | WIDE-ANGLE END | MIDDLE | TELEPHOTO END |
|---|---|---|---|
| DD[9] | 12.7445 | 4.3843 | 2.6328 |
| DD[10] | 8.9406 | 5.0048 | 1.0691 |
| DD[18] | 7.1084 | 11.0442 | 14.9799 |

TABLE 28

EXAMPLE 7·ASPHERICAL COEFFICIENT

| SURFACE NUMBER | 11 | 12 |
|---|---|---|
| KA | 1.5039929E+00 | −2.0416161E+01 |
| A3 | 0.0000000E+00 | 0.0000000E+00 |
| A4 | −9.7714535E−05 | 8.6235246E−05 |
| A5 | −4.5858523E−05 | −3.0804343E−05 |
| A6 | 1.7394086E−05 | 9.0554906E−06 |
| A7 | −3.7782702E−06 | −1.8673177E−06 |
| A8 | 2.5535682E−07 | 1.5269216E−07 |
| A9 | 1.5140957E−08 | −3.1994722E−09 |
| A10 | −2.7270000E−09 | −6.3854889E−10 |

Figure 9:
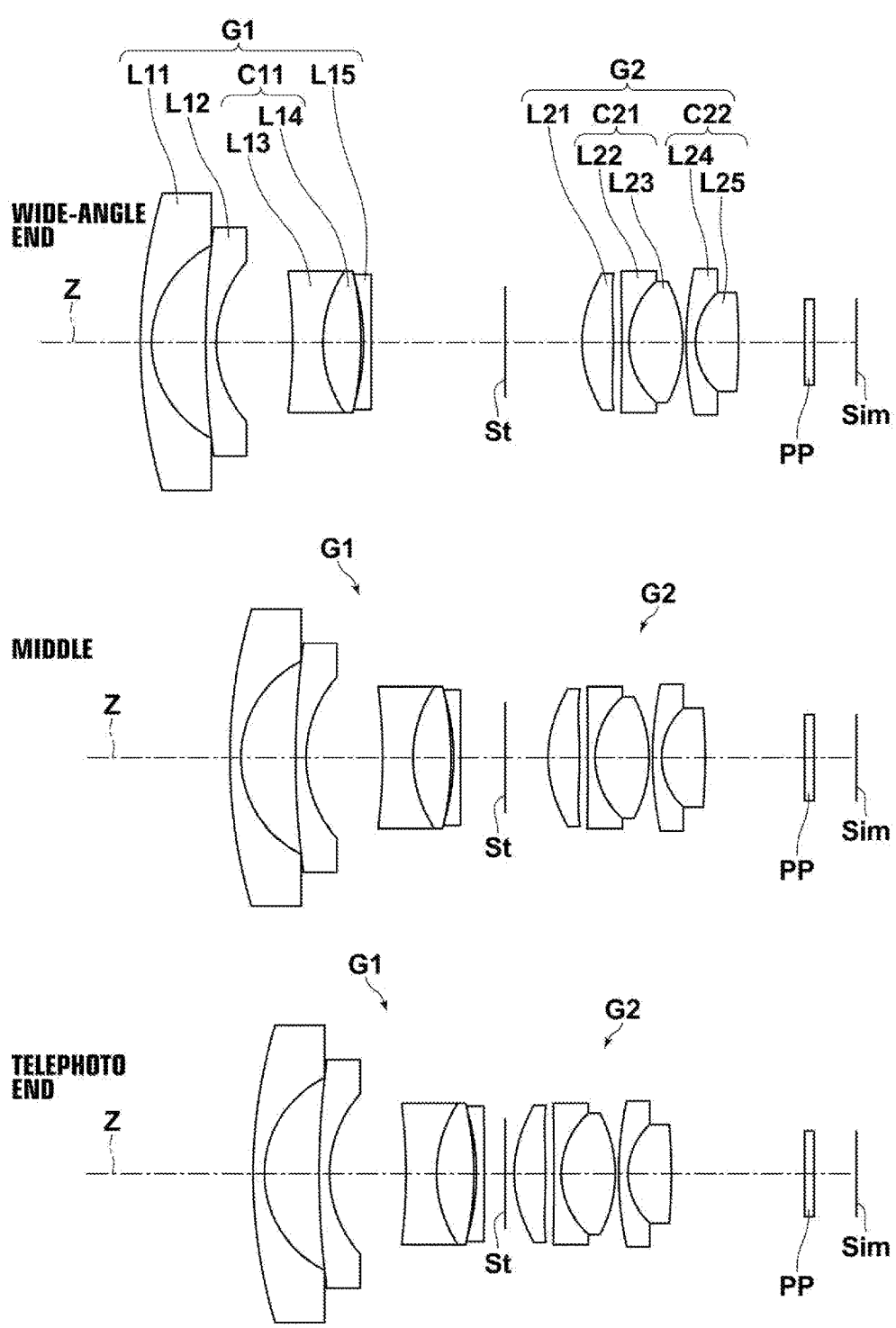
FIG. 9 is a cross section illustrating the lens configuration of a variable magnification optical system in Example 8 of the present invention.

Next, a variable magnification optical system in Example 8 will be described. The configuration of the variable magnification optical system in Example 8 is similar to that of the variable magnification optical system in Example 1. FIG. 9 is a cross section illustrating the lens configuration of the variable magnification optical system in Example 8. Table 29 shows basic lens data on the variable magnification optical system in Example 8. Table 30 shows data about specification. Table 31 shows data about moving surface distances. Table 32 shows data about aspherical coefficients. FIG. 17 illustrates aberration diagrams.

TABLE 29

EXAMPLE 8·LENS DATA (n, ν FOR d-LINE)

| SURFACE NUMBER | CURVATURE RADIUS | SURFACE DISTANCE | n | ν | θCA' |
|---|---|---|---|---|---|
| 1 | 57.1018 | 1.2042 | 1.58313 | 59.38 | |
| 2 | 11.8243 | 5.8854 | | | |
| 3 | 95.2043 | 1.1119 | 1.62041 | 60.29 | |
| 4 | 13.3171 | 8.2226 | | | |
| 5 | −61.3749 | 3.2742 | 1.59522 | 67.74 | |
| 6 | 14.1560 | 4.0787 | 1.74950 | 35.28 | |
| 7 | −33.8617 | 0.2679 | | | |
| 8 | −24.9566 | 0.8264 | 1.71700 | 47.92 | |
| 9 | −2495.7151 | DD[9] | | | |
| 10(STOP) | ∞ | DD[10] | | | |
| *11 | 13.1377 | 3.3664 | 1.49700 | 81.61 | |
| *12 | −56.8483 | 0.9131 | | | |
| 13 | −392.7156 | 0.7789 | 1.48749 | 70.23 | 0.3633 |
| 14 | 9.0000 | 5.7970 | 1.49700 | 81.54 | 0.3501 |
| 15 | −14.2339 | 0.3713 | | | |
| 16 | 37.8029 | 0.9975 | 1.72047 | 34.71 | |
| 17 | 7.4369 | 4.6759 | 1.49700 | 81.54 | |
| 18 | −68.3241 | DD[18] | | | |
| 19 | ∞ | 1.0000 | 1.51633 | 64.14 | |
| 20 | ∞ | 4.5555 | | | |

TABLE 30

EXAMPLE 8·SPECIFICATION (d-LINE)

| | WIDE-ANGLE END | MIDDLE | TELEPHOTO END |
|---|---|---|---|
| ZOOM RATIO | 1.0 | 1.6 | 2.2 |
| f | 4.20 | 6.64 | 9.07 |

TABLE 30-continued

EXAMPLE 8·SPECIFICATION (d-LINE)

|  | WIDE-ANGLE END | MIDDLE | TELEPHOTO END |
|---|---|---|---|
| Bf | 12.32 | 15.96 | 19.61 |
| FNo. | 1.62 | 1.93 | 2.31 |
| 2ω[°] | 133.8 | 80.8 | 58.6 |

TABLE 31

EXAMPLE 8·ZOOM DISTANCE

|  | WIDE-ANGLE END | MIDDLE | TELEPHOTO END |
|---|---|---|---|
| DD[9] | 14.4447 | 4.7713 | 2.2542 |
| DD[10] | 8.2572 | 4.6157 | 0.9741 |
| DD[18] | 7.1084 | 10.7499 | 14.3915 |

TABLE 32

EXAMPLE 8·ASPHERICAL COEFFICIENT

| SURFACE NUMBER | 11 | 12 |
|---|---|---|
| KA | 1.4893357E+00 | −2.0202093E+01 |
| A3 | 0.0000000E+00 | 0.0000000E+00 |
| A4 | 6.3727187E−06 | 2.4173847E−04 |
| A5 | −4.8150292E−05 | −5.2494072E−05 |
| A6 | 9.9925080E−06 | 1.0419921E−05 |
| A7 | −4.4542980E−07 | 2.8188904E−08 |
| A8 | −5.4180940E−08 | −1.3134799E−07 |
| A9 | −6.0591443E−09 | −5.1844241E−09 |
| A10 | 9.7922643E−10 | 1.4196949E−09 |

Table 33 shows values corresponding to conditional expressions (1) through (7) for the variable magnification optical systems in Examples 1 through 8.

TABLE 33

| EXPRESSION NUMBER | CONDITIONAL EXPRESSION | EXAMPLE 1 | EXAMPLE 2 | EXAMPLE 3 | EXAMPLE 4 |
|---|---|---|---|---|---|
| (1) | −1.0 < Rfl1/Rfl2 < 0.7 | 0.380 | 0.296 | 0.616 | 0.094 |
| (2) | 55.0 < vdave1 | 62.47 | 65.43 | 62.47 | 62.47 |
| (3) | 2.00 < T2/STR2 < 3.20 | 2.237 | 2.451 | 2.958 | 2.13 |
| (4) | 1.47 < ndC21n < 1.60 | 1.48749 | 1.48749 | 1.48749 | 1.48749 |
| (5) | 1.70 < ndC22n < 2.00 | 1.80100 | 1.80100 | 1.80100 | 1.80100 |
| (6) | 70.0 < vdC21ave | 75.885 | 75.885 | 75.885 | 75.885 |
| (7) | |θCA'C21n − θCA'C21p| < 0.02 | 0.013 | 0.013 | 0.013 | 0.013 |

| EXPRESSION NUMBER | CONDITIONAL EXPRESSION | EXAMPLE 5 | EXAMPLE 6 | EXAMPLE 7 | EXAMPLE 8 |
|---|---|---|---|---|---|
| (1) | −1.0 < Rfl1/Rfl2 < 0.7 | 0.500 | −0.956 | 0.055 | 0.600 |
| (2) | 55.0 < vdave1 | 60.63 | 62.47 | 62.47 | 62.47 |
| (3) | 2.00 < T2/STR2 < 3.20 | 2.151 | 2.154 | 2.108 | 2.319 |
| (4) | 1.47 < ndC21n < 1.60 | 1.48749 | 1.48749 | 1.48749 | 1.48749 |
| (5) | 1.70 < ndC22n < 2.00 | 1.80100 | 1.80100 | 1.95375 | 1.72047 |
| (6) | 70.0 < vdC21ave | 75.885 | 75.885 | 75.885 | 75.885 |
| (7) | |θCA'C21n − θCA'C21p| < 0.02 | 0.013 | 0.013 | 0.013 | 0.013 |

As these data show, all the variable magnification optical systems in Examples 1 through 8 satisfy conditional expressions (1) through (7). It is recognizable that the variable magnification optical systems have high optical performance from a visible light range to a near-infrared range.

Figure 18:
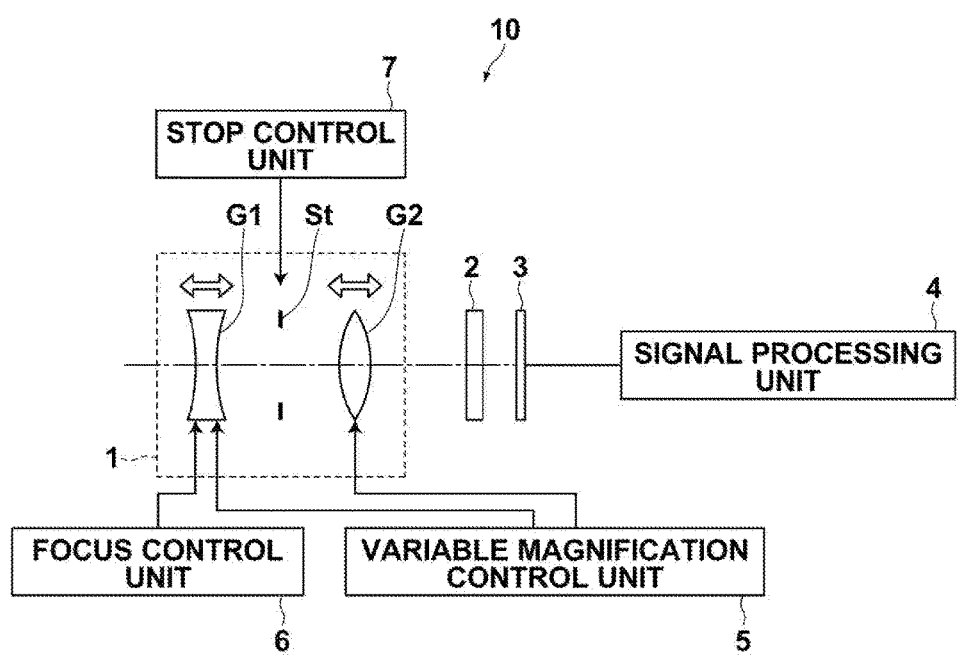
FIG. 18 is a schematic diagram illustrating the configuration of an imaging apparatus according to an embodiment of the present invention.

Next, an imaging apparatus according to an embodiment of the present invention will be described. FIG. 18 is a schematic diagram illustrating the configuration of an imaging apparatus using a variable magnification optical system according to an embodiment of the present invention, as an example of an imaging apparatus according to an embodiment of the present invention. The imaging apparatus is, for example, a surveillance camera, a video camera, an electronic still camera, or the like.

An imaging apparatus 10 illustrated in FIG. 18 includes a variable magnification optical system 1, a filter 2 arranged toward the image side of the variable magnification optical system 1, an imaging device 3 that images an image of a subject formed by the variable magnification optical system and a signal processing unit 4 that performs operation processing on a signal output from the imaging device 3. The variable magnification optical system 1 includes negative first lens group G1, aperture stop St and positive second lens group G2. In FIG. 18, each lens group is schematically illustrated. The imaging device 3 converts an optical image formed by the variable magnification optical system 1 into electrical signals. The imaging device 3 is arranged in such a manner that its imaging surface is located at the same position as the position of the image plane of the variable magnification optical system 1. For example, a CCD (Charge Coupled Device), a CMOS (Complementary Metal-Oxide-Semiconductor) or the like may be used as the imaging device 3.

Further, the imaging apparatus 10 includes a variable magnification control unit 5 for changing magnification of the variable magnification optical system 1, a focus control unit 6 for adjusting the focus of the variable magnification optical system and a stop control unit 7 for changing the aperture diameter of aperture stop St. Here, configuration in which the stop control unit 7 is omitted is adoptable.

So far, the present invention has been described by using embodiments and examples. However, the present invention is not limited to the embodiments nor the examples, and various modifications are possible. For example, values, such as the curvature radius of each lens element, distances between surfaces, refractive indices and Abbe numbers, are not limited to the values in each of the numerical value examples, but may be other values.

What is claimed is:

1. A variable magnification optical system consisting of:
a first lens group having negative refractive power:
a stop; and
a second lens group having positive refractive power in this order from an object side, and the variable magnification optical system being configured to change magnification by changing a distance between the first lens group and the second lens group in an optical axis direction and to perform correction of the position of an image plane necessitated by the change in magnification by moving the first lens group in the optical axis direction, wherein the first lens group comprises, in this order from the object side, an L11 negative meniscus lens, an L12 negative lens and a C11 cemented lens, the C11 cemented lens comprising, in this order from the object side, a biconcave lens and a positive lens cemented together, and wherein the second lens group comprises an L21 positive lens that is arranged closest to the object side of all lenses in the second lens group and includes at least one aspheric surface, and an object-side surface of which is convex, and only two cemented lenses toward an image side of the L21 positive lens, and each of which consists of a negative lens and a positive lens cemented together in this order from the object side, and one of the cemented lenses closer to the object side being a C21 cemented lens and the other one of the cemented lenses closer to the image side being a C22 cemented lens, wherein the C21 cemented lens and the C22 cemented lens each have a positive refractive power, and wherein the following conditional expressions (1) and (2) are satisfied:

$$-1.0 < Rf11/Rf12 < 0.7 \qquad (1); \text{ and}$$

$$55.0 < vdave1 \qquad (2), \text{ where}$$

Rf11: a curvature radius of an object-side surface of the L11 negative meniscus lens, Rf12: a curvature radius of an object-side surface of the L12 negative lens, and vdave1: an average of Abbe numbers for d-line of all negative lenses arranged toward the object side of the positive lens constituting the C11 cemented lens.

2. The variable magnification optical system, as defined in claim 1, wherein the second lens group moves to vary magnification and wherein the following conditional expression (3) is satisfied:

$$2.00 < T2/STR2 < 3.20 \qquad (3), \text{ where}$$

T2: a distance from a vertex of a surface closest to the object side in the second lens group to a vertex of a surface closest to the image side in the second lens group, and STR2: a movement amount of the second lens group from a wide-angle end to a telephoto end.

3. The variable magnification optical system, as defined in claim 1, wherein the following conditional expressions (4) and (5) are satisfied:

$$1.47 < ndC21n < 1.60 \qquad (4); \text{ and}$$

$$1.70 < ndC22n < 2.00 \qquad (5), \text{ where}$$

ndC21n: a refractive index for d-line of the negative lens constituting the C21 cemented lens, and ndC22n: a refractive index for d-line of the negative lens constituting the C22 cemented lens.

4. The variable magnification optical system, as defined in claim 1, wherein the following conditional expression (6) is satisfied:

$$70.0 < vdC21ave \qquad (6), \text{ where}$$

vdC21ave: an average of Abbe numbers for d-line of the two lenses constituting the C21 cemented lens.

5. The variable magnification optical system, as defined in claim 1, further comprising:

a negative meniscus lens toward the image side of the C11 cemented lens, and an object-side surface of which is concave.

6. The variable magnification optical system, as defined in claim 1, wherein the second lens group consists of five lenses of a positive lens including at least one aspheric surface, a cemented lens consisting of a negative meniscus lens having a concave image-side surface and a biconvex lens, and a cemented lens consisting of a negative meniscus lens having a concave image-side surface and a biconvex lens in this order from the object side.

7. The variable magnification optical system, as defined in claim 1, wherein the following conditional expression (4-1) is satisfied:

$$1.47 < ndC21n < 1.50 \qquad (4\text{-}1), \text{ where}$$

ndC21n: a refractive index for d-line of the negative lens constituting the C21 cemented lens.

8. An imaging apparatus comprising:

the variable magnification optical system, as defined in claim 1, wherein the variable magnification optical system provides an image on an object and further comprising an imaging device that images an image of the object formed by the variable magnification optical system.

9. A variable magnification optical system consisting of:

a first lens group having negative refractive power:

a stop; and a second lens group having positive refractive power in this order from an object side, and the variable magnification optical system being configured to change magnification by changing a distance between the first lens group and the second lens group in an optical axis direction and to perform correction of the position of an image plane necessitated by the change in magnification by moving the first lens group in the optical axis direction, wherein the first lens group comprises, in this order from the object side, an L11 negative meniscus lens, an L12 negative lens and a C11 cemented lens, the C11 cemented lens comprising, in this order from the object side, a biconcave lens and a positive lens cemented together, and wherein the second lens group comprises an L21 positive lens that is arranged closest to the object side of all lenses in the second lens group and includes at least one aspheric surface, and an object-side surface of which is convex, and only two cemented lenses toward an image side of the L21 positive lens, and each of which consists of a negative lens and a positive lens cemented together in this order from the object side, and one of the cemented lenses closer to the object side being a C21 cemented lens and the other one of the cemented lenses closer to the image side being a C22 cemented lens, and wherein the following conditional expressions (1) and (2) are satisfied:

$$-1.0 < Rf11/Rf12 < 0.7 \qquad (1); \text{ and}$$

$$55.0 < vdave1 \qquad (2), \text{ where}$$

Rf11: a curvature radius of an object-side surface of the L11 negative meniscus lens, Rf12: a curvature radius of an object-side surface of the L12 negative lens, and vdave1: an average of Abbe numbers for d-line of all negative lenses arranged toward the object side of the positive lens constituting the C11 cemented lens, and wherein the following conditional expression (7) is satisfied:

$$|\theta CA'C21n - \theta CA'C21p| < 0.02 \quad (7),\text{ where}$$

$\theta CA'C21n$: a partial dispersion ratio of C-line and A'-line of the negative lens constituting the C21 cemented lens, and $\theta CA'C21p$: a partial dispersion ratio of C-line and A'-line of the positive lens constituting the C21 cemented lens.

10. The variable magnification optical system, as defined in claim 9, wherein the second lens group moves to vary magnification and wherein the following conditional expression (3) is satisfied:

$$2.00 < T2/STR2 < 3.20 \quad (3),\text{ where}$$

T2: a distance from a vertex of a surface closest to the object side in the second lens group to a vertex of a surface closest to the image side in the second lens group, and STR2: a movement amount of the second lens group from a wide-angle end to a telephoto end.

11. The variable magnification optical system, as defined in claim 9, wherein the following conditional expressions (4) and (5) are satisfied:

$$1.47 < ndC21n < 1.60 \quad (4);\text{ and}$$

$$1.70 < ndC22n < 2.00 \quad (5),\text{ where}$$

ndC21n: a refractive index for d-line of the negative lens constituting the C21 cemented lens, and ndC22n: a refractive index for d-line of the negative lens constituting the C22 cemented lens.

12. The variable magnification optical system, as defined in claim 9, wherein the following conditional expression (6) is satisfied:

$$70.0 < vdC21ave \quad (6),\text{ where}$$

vdC21ave: an average of Abbe numbers for d-line of the two lenses constituting the C21 cemented lens.

13. The variable magnification optical system, as defined in claim 9, further comprising:

a negative meniscus lens toward the image side of the C11 cemented lens, and an object-side surface of which is concave.

14. The variable magnification optical system, as defined in claim 9, wherein the second lens group consists of five lenses of a positive lens including at least one aspheric surface, a cemented lens consisting of a negative meniscus lens having a concave image-side surface and a biconvex lens, and a cemented lens consisting of a negative meniscus lens having a concave image-side surface and a biconvex lens in this order from the object side.

15. The variable magnification optical system, as defined in claim 9, wherein the following conditional expression (4-1) is satisfied:

$$1.47 < ndC21n < 1.50 \quad (4\text{-}1),\text{ where}$$

ndC21n: a refractive index for d-line of the negative lens constituting the C21 cemented lens.

16. An imaging apparatus comprising:

the variable magnification optical system, as defined in claim 9, wherein the variable magnification optical system provides an image on an object and further comprising an imaging device that images an image of the object formed by the variable magnification optical system.

17. A variable magnification optical system consisting of:
a first lens group having negative refractive power:
a stop; and
a second lens group having positive refractive power in this order from an object side, and the variable magnification optical system being configured to change magnification by changing a distance between the first lens group and the second lens group in an optical axis direction and to perform correction of the position of an image plane necessitated by the change in magnification by moving the first lens group in the optical axis direction, wherein the first lens group comprises, in this order from the object side, an L11 negative meniscus lens, an L12 negative lens and a C11 cemented lens, the C11 cemented lens comprising, in this order from the object side, a biconcave lens and a positive lens cemented together, and wherein the second lens group comprises an L21 positive lens that is arranged closest to the object side of all lenses in the second lens group and includes at least one aspheric surface, and an object-side surface of which is convex, and only two cemented lenses toward an image side of the L21 positive lens, and each of which consists of a negative lens and a positive lens cemented together in this order from the object side, and one of the cemented lenses closer to the object side being a C21 cemented lens and the other one of the cemented lenses closer to the image side being a C22 cemented lens, and wherein the following conditional expressions (1) and (2) are satisfied:

$$-1.0 < Rf11/Rf12 < 0.7 \quad (1);\text{ and}$$

$$55.0 < vdave1 \quad (2),\text{ where}$$

Rf11: a curvature radius of an object-side surface of the L11 negative meniscus lens, Rf12: a curvature radius of an object-side surface of the L12 negative lens, and vdave1: an average of Abbe numbers for d-line of all negative lenses arranged toward the object side of the positive lens constituting the C11 cemented lens, and wherein the following conditional expression (4-1) is satisfied:

$$1.47 < ndC21n < 1.50 \quad (4\text{-}1),\text{ where}$$

ndC21n: a refractive index for d-line of the negative lens constituting the C21 cemented lens.

18. The variable magnification optical system, as defined in claim 17, wherein the second lens group moves to vary magnification and wherein the following conditional expression (3) is satisfied:

$$2.00 < T2/STR2 < 3.20 \quad (3),\text{ where}$$

T2: a distance from a vertex of a surface closest to the object side in the second lens group to a vertex of a surface closest to the image side in the second lens group, and STR2: a movement amount of the second lens group from a wide-angle end to a telephoto end.

19. The variable magnification optical system, as defined in claim 17, wherein the following conditional expression (6) is satisfied:

$$70.0 < vdC21ave \quad (6),\text{ where}$$

vdC21ave: an average of Abbe numbers for d-line of the two lenses constituting the C21 cemented lens.

20. An imaging apparatus comprising:
the variable magnification optical system, as defined in claim 17, wherein the variable magnification optical system provides an image on an object and further comprising an imaging device that images an image of the object formed by the variable magnification optical system.

\* \* \* \* \*